United States Patent
Myers et al.

(10) Patent No.: US 11,225,012 B2
(45) Date of Patent: Jan. 18, 2022

(54) CONSTRUCTION OF TUBULAR ASSEMBLIES

(71) Applicant: LONG PIPES USA, INC., Yangebup (AU)

(72) Inventors: Andrew Myers, Roleystone (AU); Neil Deryck Bray Graham, Coogee (AU); Arthur Derrick Bray Graham, North Fremantle (AU)

(73) Assignee: LONG PIPES USA, INC., Yangebup (AU)

( * ) Notice: Subject to any disclaimer, the term of this patent is extended or adjusted under 35 U.S.C. 154(b) by 273 days.

(21) Appl. No.: 16/618,255

(22) PCT Filed: Jun. 1, 2017

(86) PCT No.: PCT/AU2017/050530
§ 371 (c)(1),
(2) Date: Nov. 29, 2019

(87) PCT Pub. No.: WO2017/205928
PCT Pub. Date: Dec. 7, 2017

(65) Prior Publication Data
US 2021/0154909 A1    May 27, 2021

(51) Int. Cl.
*B29C 63/06* (2006.01)
*B29C 53/48* (2006.01)
(Continued)

(52) U.S. Cl.
CPC ............ *B29C 63/065* (2013.01); *B29C 53/48* (2013.01); *B29C 53/54* (2013.01);
(Continued)

(58) Field of Classification Search
CPC ..... B29C 53/48; B29C 53/54; B29C 63/0021; B29C 63/065; B29C 65/4815;
(Continued)

(56) References Cited

U.S. PATENT DOCUMENTS 3,376,181 A * 4/1968 Larson .................. B31F 1/0061
156/203
3,407,107 A 10/1968 Skoggard et al.
(Continued)

FOREIGN PATENT DOCUMENTS

CA         2005009       6/2000

OTHER PUBLICATIONS

International Search Report for International Application No. PCT/AU2017/050530 dated Aug. 1, 2017 (6 pages).
(Continued)

*Primary Examiner* — Philip C Tucker
*Assistant Examiner* — Brian R Slawski
(74) *Attorney, Agent, or Firm* — Merchant & Gould P.C.

(57) ABSTRACT

A method and apparatus for constructing a tubular assembly 40 comprising an inner portion (24) and a further portion (23) surrounding the inner portion. The inner portion (24) comprises reinforcement (37) and the further portion (23) being formed from a strip (50) of material comprising two opposed longitudinal marginal side portions (53). The apparatus comprises an assembly station (220) comprising a wall (253). The apparatus comprises means for advancing the inner portion (21) along a first path (231) extending passed the wall (253), and means for advancing the strip (50) along a second path (232) and causing the strip to encircle the wall (253) and thereby wrap about and surround the inner portion (21). The apparatus further comprises means (321) for introducing resinous binder into the reinforcement (37) as the strip (50) is being wrapped about the inner portion (21).

1 Claim, 20 Drawing Sheets

(51) Int. Cl.
*B32B 1/08* (2006.01)
*B32B 27/04* (2006.01)
*B29C 53/54* (2006.01)
*B29C 63/00* (2006.01)
*B32B 3/26* (2006.01)
*B32B 5/02* (2006.01)
*B32B 7/06* (2019.01)
*B32B 7/14* (2006.01)
*B32B 13/12* (2006.01)
*B32B 13/14* (2006.01)
*B32B 27/12* (2006.01)
*B32B 27/30* (2006.01)
*B32B 27/32* (2006.01)
*B32B 27/40* (2006.01)
*B29K 105/08* (2006.01)
*B29L 23/00* (2006.01)

(52) U.S. Cl.
CPC ............ *B29C 63/0021* (2013.01); *B32B 1/08* (2013.01); *B32B 3/266* (2013.01); *B32B 5/024* (2013.01); *B32B 7/06* (2013.01); *B32B 7/14* (2013.01); *B32B 13/12* (2013.01); *B32B 13/14* (2013.01); *B32B 27/04* (2013.01); *B32B 27/12* (2013.01); *B32B 27/304* (2013.01); *B32B 27/32* (2013.01); *B32B 27/40* (2013.01); *B29K 2105/0845* (2013.01); *B29L 2023/22* (2013.01); *B32B 2260/021* (2013.01); *B32B 2260/046* (2013.01); *B32B 2262/101* (2013.01); *B32B 2307/51* (2013.01); *B32B 2307/746* (2013.01); *B32B 2307/748* (2013.01); *B32B 2597/00* (2013.01)

(58) Field of Classification Search
CPC ............... B29C 65/542; B29C 66/63; B29K 2105/0845; B29L 2023/22; B32B 1/08; B32B 13/12; B32B 13/14; B32B 2260/021; B32B 2260/046; B32B 2262/101; B32B 2307/51; B32B 2307/746; B32B 2307/748; B32B 2597/00; B32B 27/04; B32B 27/12; B32B 27/304; B32B 27/32; B32B 27/40; B32B 3/266; B32B 5/022; B32B 5/024; B32B 7/06; B32B 7/14; B32B 37/0038; B32B 37/0046; B32B 37/1292; B32B 37/28; B32B 38/08
USPC ......... 156/60, 196, 200, 201, 202, 203, 212, 156/213, 214, 215, 218, 290, 291, 305, 156/308.2, 308.4, 324, 349, 423, 433, 156/443, 459, 461, 465, 466, 468, 470, 156/538, 539, 543, 544, 546
See application file for complete search history.

(56) References Cited

U.S. PATENT DOCUMENTS 3,754,064 A * 8/1973 Snelling .................. B29C 53/48
264/40.5
2014/0261843 A1 9/2014 Graham

OTHER PUBLICATIONS

International Written Opinion for International Application No. PCT/AU2017/050530 dated Aug. 1, 2017 (5 pages).

* cited by examiner

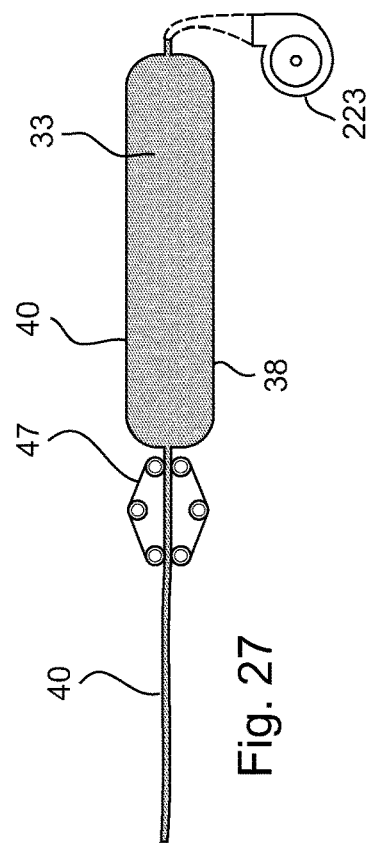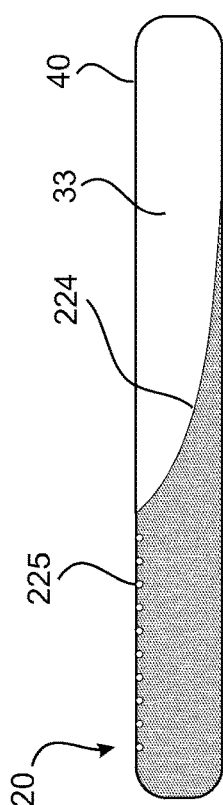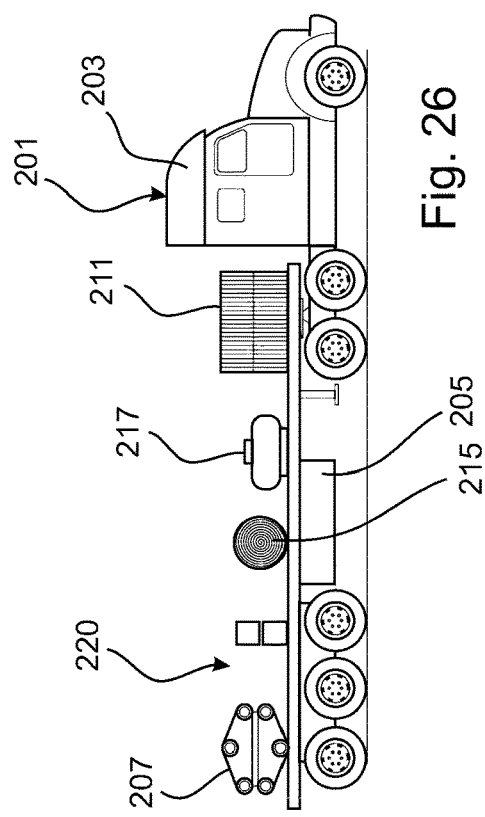

CONSTRUCTION OF TUBULAR ASSEMBLIES

This application is a National Stage Application of PCT/AU2017/050530, filed 1 Jun. 2017 and which application is incorporated herein by reference. To the extent appropriate, a claim of priority is made to each of the above disclosed applications.

TECHNICAL FIELD

This invention relates to elongate hollow structures of composite construction, including in particular tubular structures. More particularly, the invention is concerned with the construction of a tubular assembly used in the production of tubular structures.

While the inventions has been devised particularly in relation to the production of tubular structures in the form of pipes, it may also be applicable to the production of other elongate hollow elements, including for example tubular elements (such as ducts and tubes), tubular structural elements (such as shafts, beams and columns), and other tubular elements of composite construction.

BACKGROUND ART

The following discussion of the background art is intended to facilitate an understanding of the present invention only. The discussion is not an acknowledgement or admission that any of the material referred to is or was part of the common general knowledge as at the priority date of the application.

The discussion is provided in the context of the construction of tubular structures in the form of pipes, although the invention may have application to other elongate hollow structures of composite construction, as would be understood by a person skilled in the art.

It is known to construct pipes using fibre-reinforced plastic composites. Typically, such pipes are constructed by a process in which rovings of filaments of fibre material, (such as glass fibres) are impregnated with a thermosettable resin or thermoplastic composition and wound back and forth on a mandrel to form a pipe wall structure of composite construction. The pipes are then joined together in the field with rubber adhesive or wrapped fibreglass joints to form a pipeline.

Further, there have been attempts to produce a continuous pipe by pultrusion, involving a wet body of reinforcement fibres being drawn through a heated mould to cure the pipe and the pipe then wound onto a spool. Pipes constructed in this way are typically limited to lengths of about 1 km and diameters of about 100 mm Typically, such pipes are required to bear both hoop and axial stresses, and the construction can be a compromise between the hoop and axial stress bearing properties required for the pipe. Hoop strength can be optimised by winding the reinforcing filaments at an angle approaching 90° to the pipe axis. Axial strength can be optimised by winding the reinforcing filaments at an angle approaching the pipe axis.

The length of pipe that can be constructed in such a way is dictated by the length of the mandrel or the roll of pipe that can be transported. Consequently, the construction process is not conducive to construction of long pipes to form a transportation network for liquids and gasses; that is, pipes which are much longer than available mandrels and also pipes which are of a length to constitute a pipeline extending continuously between two distant locations, perhaps hundreds to thousands of kilometres apart.

It would be advantageous for there to be a way in which a pipeline could be constructed using a pipe constructed on a continuous basis; that is, without having to be composed of a series of relatively short pipe sections joined one to another at junctions which are likely constituted areas of weakness in structural integrity of the pipeline There may, however, be circumstances where the pipeline cannot be constructed using a single pipe constructed on a continuous basis. In such circumstances, the pipeline may be constructed using a plurality of pipes each constructed on a continuous basis and connected one to another. This may, for example, apply to a pipeline which is required to be constructed in more than one pipe production run, in which case a continuous pipe produced in one production run would need to be connected to a pipe produced in a successive production run.

Construction of pipeline on a continuous basis is proposed in the Applicant's international application PCT/AU2011/001401, the contents of which are incorporated herein by way of reference.

The pipeline is of composite construction, comprising a radially inner portion and a radially outer portion, with the two portions merging together to provide an integrated tubular wall structure. The inner portion is configured as an inner tube constructed from an inner liner with a layer of resin absorbent material bonded onto one face thereof. The other face of the inner liner defines the interior surface of the pipe. Typically, the liner presents a high gloss surface at the inner face. The inner liner may, for example, comprise polyurethane, polyethylene or any other resiliently flexible material which is preferably also impervious to air and also compatible to fluid to be conveyed within the pipe. The resin absorbent layer may, for example, comprise felt or flock.

The inner tube is constructed from a strip of material which provides the inner liner by rolling the strip longitudinally into a tubular configuration.

The outer portion is configured as an outer tube of fibre reinforced composite construction surrounded by a flexible outer casing. More particularly, the outer tube comprises reinforcement impregnated in a resinous binder. The flexible outer casing is installed around the outer tube to contain the resinous binder, and may remain in place and ultimately form an integral part of the pipe or it may be subsequently removed after having served its purpose.

The resinous material which provides the resinous binder may be of any appropriate type; a particularly suitable resinous material may comprise thermosetting resin such as epoxy vinyl ester or other suitable resin and thermoplastic resin systems.

The reinforcement may comprise one or more layers of reinforcing fabric, each layer being configured as a tubular layer disposed about the inner tube. The reinforcing fabric may comprise reinforcing fabric which incorporates reinforcement fibres featuring quad-axial fibre orientations. The reinforcement fibres may comprise glass fibres. The quad-axial fibre orientations offer the necessary hoop and axial stress bearing properties to the pipe.

Constructing the inner tube from a strip of material which is rolled longitudinally into a tubular configuration is not particularly conducive to cost-effective manufacture on a large scale. Further, constructing the outer tube as one or more layers of reinforcing fabric in a tubular arrangement about the inner tube can present challenges. Accordingly, it may be advantageous to pre-fabricate the assembly of the inner portion and the outer portion, and deliver the prefabricated assembly to the site at which the pipeline is to be constructed and laid. Further, it may be advantageous to install the flexible outer casing about the assembly of the inner portion and the outer portion, and also introduce the resinous binder to impregnate the reinforcement, at the site during construction of the pipeline.

It is against this background, and the problems and difficulties associated therewith, that the present invention has been developed.

More particularly, an aspect of the present invention seeks to install the flexible outer casing about the prefabricated assembly of the inner portion and the outer portion and also introduce the resinous binder to impregnate the reinforcement.

SUMMARY OF INVENTION

According to a first aspect of the present invention there is provided a method of constructing a tubular assembly comprising an inner portion and a further portion surrounding the inner portion, the method comprising: provided a prefabricated tubular assembly to provide the inner portion; the prefabricated tubular assembly comprising reinforcement; providing a strip of material to form the further portion, causing the strip to wrap about and surround the prefabricated tubular assembly; and introducing resinous binder into the reinforcement as the strip is being wrapped about the prefabricated tubular assembly.

The resinous binder may be introduced into the reinforcement through a surface over which the prefabricated tubular assembly is caused to move.

The surface may have a least one port through which the resinous binder is delivered to the reinforcement The resinous binder may be introduced into the reinforcement by injection.

The further portion may provide an outer casing about the inner portion.

The outer casing may comprise a flexible outer casing.

The flexible outer casing may have some resilience in order to yielding resist radial expansion of the reinforcement. In this way, the flexible outer casing may function to control the rate of radial expansion of the reinforcement.

The reinforcement may comprise a plurality of layers configured as tubular layers disposed one about another.

Each tubular layer may comprise a strip having a central longitudinal portion and two longitudinal marginal side portions on opposed sides of the central longitudinal portion, the strip being assembled into a tubular configuration with the two marginal side portions being disposed in overlapping relation and affixed together to provide a longitudinal lap seam, the longitudinal lap seam being constructed to facility slippage between the two marginal side portions.

With this arrangement, the two marginal side portions of each layer are yieldingly connected together at the longitudinal lap seam.

The slippage may be a controlled slippage in the sense that it occurs in selected circumstances, such as radial expansion of the respective tubular layer.

The slippage may be controlled (predetermined or designed) to ensure that loading generated by expansion of the inner tube upon inflation thereof is able to be transferred successively through the surrounding layers outwardly from the innermost layer.

The slippage may comprise some relative movement between the two marginal side portions within the longitudinal lap seam.

The flexible outer casing may function to control the rate of radial expansion of the reinforcement.

The inner portion may further comprise an inner tube about which the reinforcement is disposed.

The method may further comprise radially expanding the inner tube, wherein the radially expanding inner tube may operate in conjunction with the flexible outer casing to confine the reinforcement and also causes a space between the inner tube and the outer casing within which the reinforcement is confined to progressively decrease. This may force the resinous binder introduced into the reinforcement to fully impregnate the reinforcement.

Expansion of the inner tube causing loading to be transferred successively through the surrounding layers outwardly from the innermost layer, progressively tensioning the reinforcement.

The resinous binder is caused to move through the reinforcement within the space as a progressively rising resin pool as a consequence of the progressively decreasing volume of the space. The resinous binder may also function as a lubricant to facilitate slip between adjacent layers upon continued radial expansion of the inner tube Inflation of the inner tube brings the inner tube into direct contact with the reinforcement, and also brings the reinforcement into direct contact with the outer casing (through the resinous binder if present).

Progressive decrease in volume of the space in which the reinforcement is confined, acts to positively expel air from within the space which has the effect of enhancing impregnation of the resinous binder within the reinforcement. The outer casing and the various tubular layers constituting the reinforcement may be adapted to facilitate the expulsion of the air. By way of example, interstices within the tubular layers which constitute the reinforcement may provide pathways for air expulsion. Further, the outer casing and possibly also the tubular layers may incorporate vents at intervals along their respective lengths to facilitate introduction of the resinous binder and expulsion of the air.

The outer casing is adapted to sustain the inflation pressure and constrain expansion of the reinforcement. The outer casing yielding resists expansion of the reinforcement and is so doing serves to control the expansion of the reinforcement. In particular, the outer casing has the effect of limiting the extent of slippage within the longitudinal seams of the tubular layers, thereby limiting the expansion of the reinforcement. In other words, the outer casing prevents over expansion of the reinforcement.

According to a second aspect of the invention there is provided apparatus for performing the method according to the first aspect of the invention.

According to a third aspect of the invention there is provided apparatus for constructing a tubular assembly comprising an inner portion and a further portion surrounding the inner portion, the inner portion comprising reinforcement and the further portion being formed from a strip of material comprising two opposed longitudinal marginal side portions; the apparatus comprising: an assembly station comprising a wall; means for advancing the inner portion along a first path extending passed the wall; means for advancing the strip along a second path and causing the strip to encircle the wall and thereby wrap about and surround the inner portion, and means for introducing resinous binder into the reinforcement as the strip is being wrapped about the prefabricated tubular assembly.

The apparatus may comprise a surface over which the inner portion is caused to move.

The means for introducing resinous binder into the reinforcement may comprise the surface, wherein resinous binder can be delivered into the reinforcement through the surface.

The surface may have a least one port through which the resinous binder is delivered to the reinforcement.

The term "concentrically", and related term "concentric", as used herein refers to an arrangement comprising a plurality of layers one encircling another. The layers may simply be wrapped one about another, and need not necessarily have a common geometric centre.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 26 depicts a mobile facility for production of the pipe, the mobile facility including an assembly apparatus to install a flexible outer casing around the prefabricated tubular assembly to provide the assembled tubular structure;

FIG. 27 depicts, schematically, inflation of an assembled tubular structure as part of the production process;

FIG. 28 depicts, schematically, inflation of the assembled tubular structure and movement of resinous binder through reinforcement within the assembled tubular structure;

In the drawings like structures are referred to by like numerals throughout the several views. The drawings shown are not necessarily to scale, with emphasis instead generally being placed upon illustrating the principles of the present invention.

Figure 1:
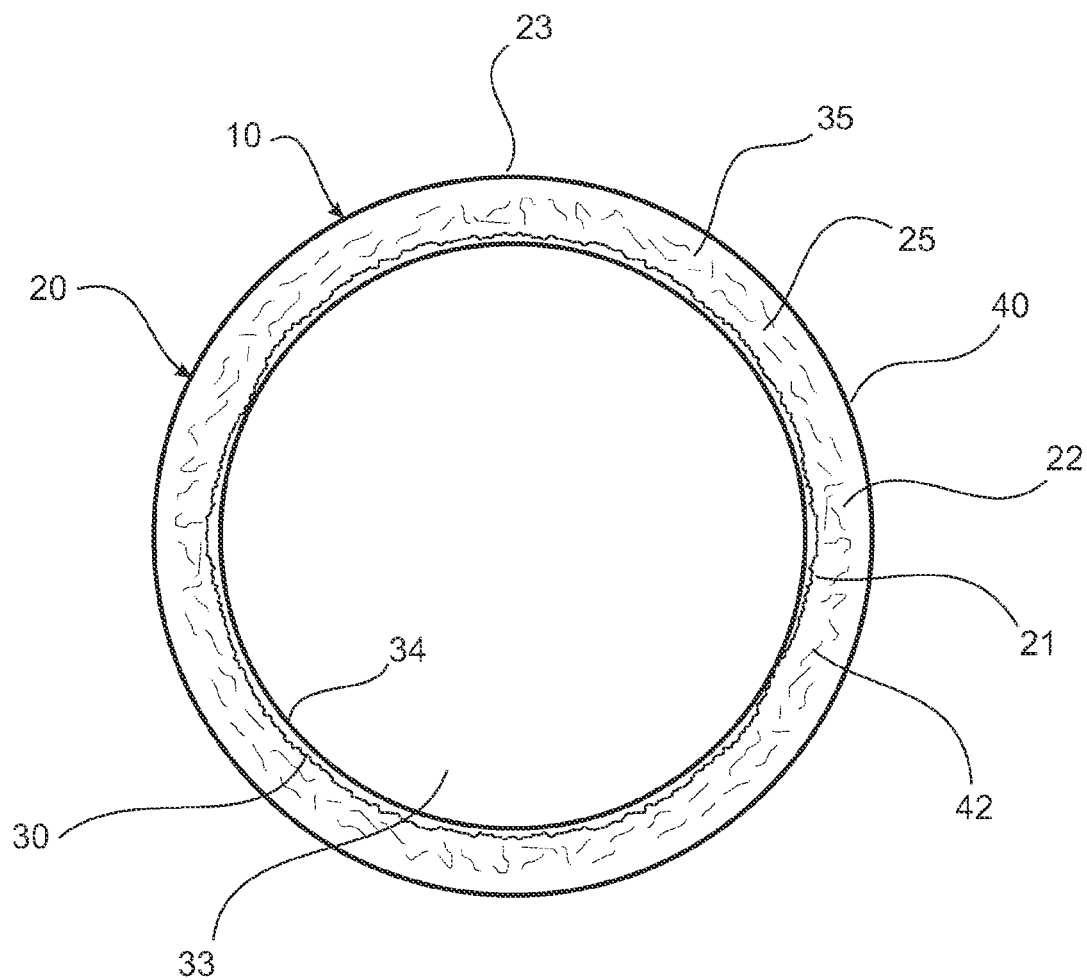
FIG. 1 is a cross-sectional view of a pipe comprising a radially inner portion and a radially outer portion, with the two portions merging together to provide an integrated tubular wall structure.
Figure 2:
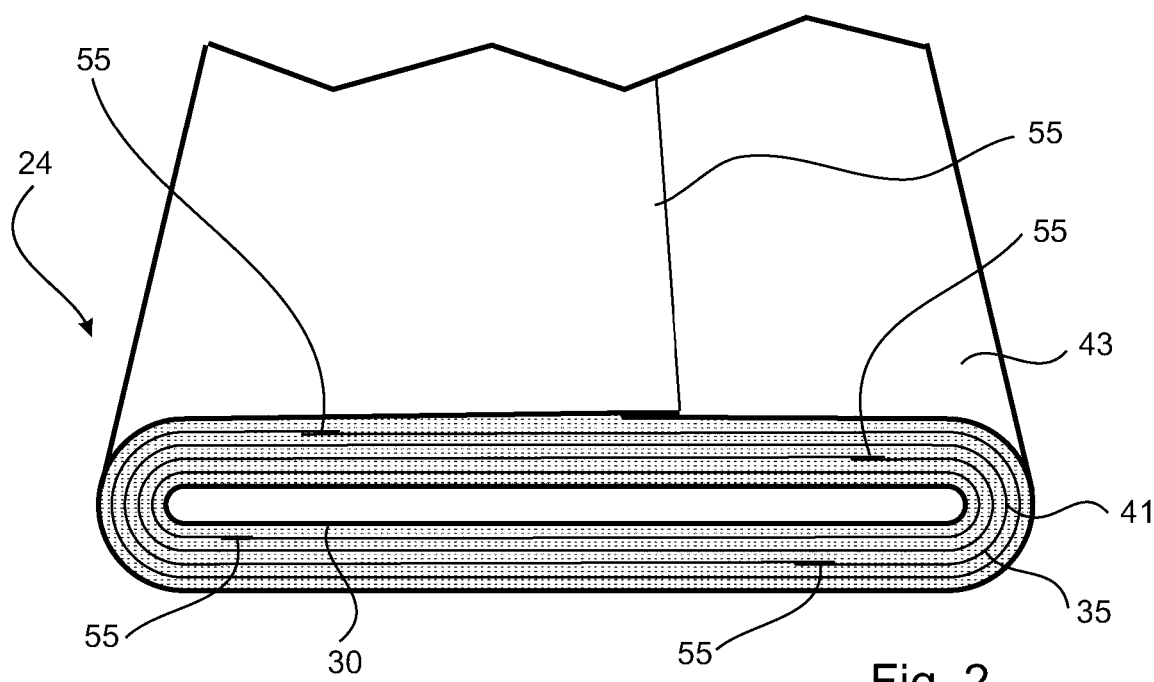
FIG. 2 is a view of a prefabricated tubular assembly providing the inner portion and outer portion for use in construction of the pipe shown in FIG. 1, the prefabricated tubular assembly being shown in a "lay-flat" condition.

The figures depict several embodiments of the invention. The embodiments illustrate certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

This disclosure is concerned with construction of a pipeline 10 of composite construction. The pipeline 10 comprises pipe 20 comprising a radially inner portion 21 and a radially outer portion 22, with the two portions 21, 22 merging together about an outer casing 23 to provide an integrated tubular wall structure 25.

The integrated tubular wall structure 25 may be encased within a protective sheath comprising a hardenable composition such as cement or concrete contained by an outermost skin of any suitable material, such as geotextile cloth. Such a protective sheath is intended to afford protection to the pipe 20 against compression loading to which it might be exposed once in the installed condition. However, it likely that the protective sheath will not be employed in many instances; for example, in underground applications. In other applications, such as for example exposed application (above ground for instance) and in marine applications, the protective sheath may provide a surface exposed to the surrounding environment.

The inner and outer portions 21, 22 are integrated into a prefabricated tubular assembly 24, as will be described in more detail later. The prefabricated tubular assembly 24 is of a multi-layer construction. The prefabricated tubular assembly 24 would typically be produced at a production facility and transported to site for use in construction of the pipe 20. The prefabricated tubular assembly 24 would typically be adapted to assume a compact condition for storage and transportation. For example, the prefabricated assembly 24 may be adapted to assume a lay-flat state and then be stored in a manner facilitating deployment as required; for example, it may be stored in a folded condition with sections thereof folded back-and-forth one upon another or stored in a rolled condition upon a reel. The prefabricated assembly 24 would typically be provided in lengths, each length being adapted to assume the lay-flat state and stored as described.

The inner portion 21 comprises an inner tube 30. Prior to formation of the integrated tubular wall structure 25 of the pipe 20, the inner tube 30 defines an inflatable bladder having an inflation cavity 33. With this arrangement, the inner tube 30 can be caused to undergo radial expansion upon inflation of bladder by introduction of an inflation fluid such as, for example, air or water. The inflation pressure required to inflate the inner tube 30 and support reinforcement within the outer portion 22 after wet- out but before gelation and curing (which reinforcement will be described later) is relatively low; typically in the order of 5-30 psi or 0.3-2 bar.

Upon formation of the integrated tubular wall structure 25, the inner tube 30 also defines the interior wall 34 of the pipe 20.

The outer portion 22 is of annular formation, being configured as an outer tube 35 comprising reinforcement 37 for impregnation by a resinous binder. The flexible outer casing 23 is disposed around the outer tube 35 to contain resinous binder impregnating the reinforcement 37 prior to curing to provide the outer tube 35.

The flexible outer casing 23 may have some resilience in order to yieldingly resist radial expansion of the reinforcement. In this way, the flexible outer casing may function to control the rate of radial expansion of the reinforcement.

The flexible outer casing 23 may be formed of any appropriate material, including for example polyethylene. The outer casing 23 may remain in place and ultimately form an integral part of the pipe 20, or it may be subsequently removed after having served its purpose in the construction process.

The outer casing 23 may comprise an outer layer of polyethylene or TPU or PVC, and a fibrous layer bonded onto one face thereof, the arrangement being that the fibrous layer confronts the reinforcement 37. The fibrous layer provides reinforcement of the outer casing 23 so that it provides the restraining force for the controlled expansion of the prefabricated tubular assembly 24. The fibrous layer may provide a breather layer and may also be ultimately impregnated with the resinous binder for integration of the prefabricated tubular assembly 24.

The prefabricated tubular assembly 24 and the surrounding outer casing 23 together provide an assembled tubular structure 40 which is ultimately formed into pipe 20.

The resinous material which provides the resinous binder may be of any appropriate type. A particularly suitable resinous material may comprise thermosetting resin such as epoxy vinyl ester or other suitable resin and thermoplastic resin systems.

The reinforcement 37 may comprise one or more layers 41 of reinforcing material, each layer 41 being configured as a tubular layer disposed somewhat concentrically about the tube 30. The reinforcing material may comprise fabric; preferably, woven reinforcing fabric or non crimped fabric such as SAERTEX stitched quad-axial, which incorporates reinforcement fibres featuring quad-axial fibre orientations. The quad-axial fibre orientations offer the necessary hoop and axial stress bearing properties to the pipe. The reinforcement fibres may comprise glass fibres, although other reinforcement fibres are also contemplated The various concentric reinforcing fabric tubular layers 41 are sized one with respect to another to facilitate slip between the layers upon radial expansion of the inner tube 30 about which they are disposed. As the layers 41 expand, the reinforcement fibres featuring quad-axial fibre orientations progressively tension.

The prefabricated tubular assembly 24 may further comprise infusion media to facilitate distribution of the resinous binder required to impregnate the layers 41 of reinforcing fabric. The infusion media may be provided as a tubular layer 43 concentrically surrounding the layers 41 of reinforcing fabric. With this arrangement, the infusion media layer 43 may function as an outer skin for the prefabricated tubular assembly 24.

The flexible outer casing 23 serves to resist radial expansion of the concentric reinforcing fabric tubular layers 41 (which constitute the reinforcement 37) upon radial expansion of the inner tube 30, thereby causing the reinforcement 37 to be subjected to radial compression. With this arrangement, the reinforcement 37 is confined in a space 42 between the expanding inner tube 30 and the flexible outer casing 23. Specifically, the radially expanding inner tube 30 operates in conjunction with the flexible outer casing 23 to confine the reinforcement 37 and also causes the volume of the space 42 in which the reinforcement is confined to progressively decrease. This forces the resinous binder within the reinforcement 37 to fully impregnate the reinforcement; that is, the layers 41 of reinforcing fabric (configured as the tubular layers which constitute the reinforcement) become fully "wetted-out". In particular, it provides a compaction force to the reinforcement 37 and effectively pumps the resinous binder through the layers of reinforcing fabric to distribute the resinous binder within the space in a controlled and constrained manner. The resinous binder is caused to move through the reinforcement 37 within the space as a progressively rising resin pool as a consequence of the progressively decreasing volume of the space. The progressively rising resin pool is akin to a wave of resin The resinous binder may also function as a lubricant to facilitate slip between adjacent layers 41 upon continued radial expansion of the inner tube 30

It is a particular feature of this process that the step of delivering resinous binder to the reinforcement 37 (being the concentric layers 41), and the step of fully wetting out the reinforcement with the resinous binder, are separate and distinct actions, as will be explained further later.

Further, the progressive decrease in volume of the space 42 in which the reinforcement 37 is confined, acts to positively expel air from within the space which has the effect of enhancing impregnation of the resinous binder within the reinforcement. The outer casing 23 and the various reinforcing fabric tubular layers 41 (which constitute the reinforcement 37) may be adapted to facilitate the expulsion of the air. By way of example, any breather layer defined by the fibrous inner layer of the outer casing 23 may facilitate this expulsion of air. Further, interstices within the reinforcing fabric tubular layers which constitute the reinforcement may provide pathways for air expulsion. Still further, the outer casing 23 and possibly also some of the various reinforcing fabric tubular layers may, for example, incorporate vents at intervals along their respective lengths to facilitate expulsion of the air. In one arrangement, the vents may comprise perforations, such as puncture holes, formed in the outer casing 23. With such an arrangement, the perforations are ultimately sealed by the resinous binder to ensure the sealed integrity of the pipe 20. In another arrangement, the vents may comprise ports inserted in the outer casing 23 and the various reinforcing fabric tubular layers which constitute the reinforcement 37. The ports may, for example, comprise tubular inserts formed of a material which dissolves or otherwise degrades upon exposure to the resinous binder. With such an arrangement, the apertures in which the ports were accommodated are ultimately sealed by the resinous binder to ensure the sealed integrity of the pipe 20.

The flexible outer casing 23 may have some resilience in order to yielding resist radial expansion of the concentric reinforcing fabric tubular layers 41 (which constitute the reinforcement 37), at least to some extent. In this way, the flexible outer casing 23 can cushion the initial stage of the radial expansion of the reinforcing fabric tubular layers. In particular, it is desirable that the flexible outer casing 23 have some elasticity; for example, elasticity in the range of about 1% to 10%. The flexible outer casing 23 may have some elasticity for the purpose of enhancing control of the rate at which the progressively rising pool of resinous binder progressively wets the reinforcement 37. Control of the rate at which the progressively rising pool of resinous binder progressively wets the reinforcement 37 is desirable. If, for example, the resinous binder rises within the space too rapidly, it may be that full wet-out of fibres in the reinforcement 37 might not be achieved, with the result only a layer of resin encases the fibre bundles but does not fully wet the fibres at the centre of the fibre bundle. If, on the other hand, the resinous binder rises within the space too slowly, it may be that the resinous binder could commence to cure before full wet-out of fibres in the reinforcement 37 is achieved.

The elastic nature of the flexible outer casing 23 installed around the reinforcement 37 functions somewhat as a girdle for controlling external pressure exerted on the rising pool of resinous binder. The elastic characteristic of the flexible outer casing 23 is selected to achieve the desired rate of wet-out. The elastic force exerted by the outer casing 23 provides some counterbalancing of the tension exerted by the inflating bladder 31 defined by the inner tube 30. Inflation of the assembled tubular structure 40 brings the inner tube 30 into direct contact with the reinforcement 37, and also brings the reinforcement 37 into direct contact with the outer casing 23.

The inflatable bladder 31 is typically maintained in the inflated condition until such time as the resinous binder has hardened sufficiently to maintain the form and shape of the pipe 20, after which the inflation fluid can be released from the inflation cavity 33. The pipe 20 is thus formed, with the inner tube 30 defining the central flow passage within the pipe.

In order to inflate the inner tube 30 and the assembled tubular structure 40, it is necessary to close the inner tube 30. This is done by locally compressing the assembled tubular structure 40 to establish a closure zone at a location distal to an end from which the inflation fluid is introduced so that inflation fluid cannot pass through, and progressively moving the local compression along the tubular structure to progressively advance the closure zone along the inner.

The prefabricated tubular assembly 24 is produced at a production facility featuring an assembly station(s) 100 at which the various layers 41, 43 are installed about the inner tube 30. The prefabricated tubular assembly 24 would be transported from the production facility to site for use in construction of the pipe 20.

Figure 4:
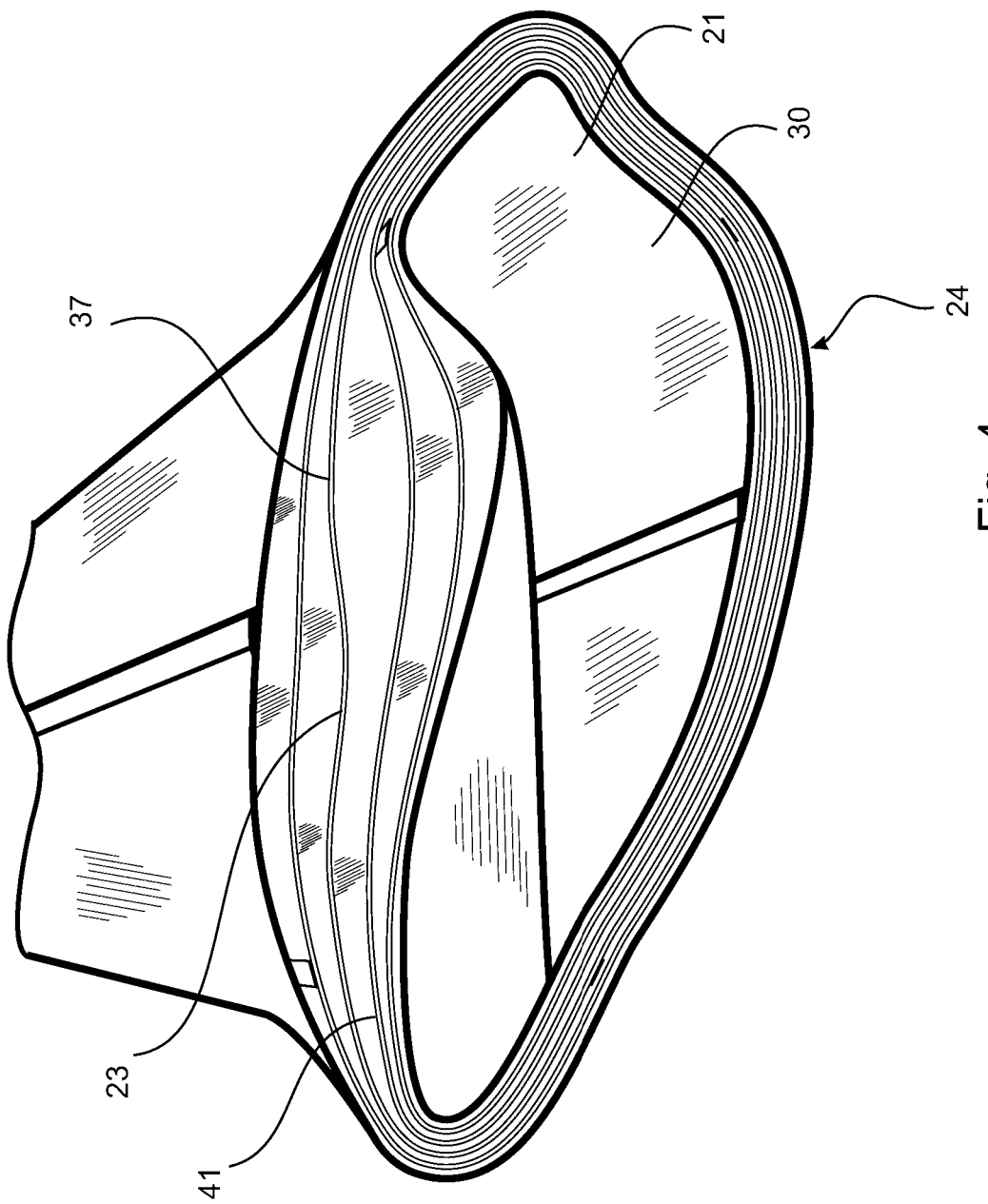
FIG. 4 is a further view of the prefabricated tubular assembly shown in a "lay-flat" condition but opened somewhat to reveal internal parts.

The inner portion 21 comprises tube 30, and the outer portion 22 comprises one or more layers 41 of reinforcing fabric and optionally also infusion media layer 43. Each layer 41, 43 is configured as a tubular layer disposed concentrically about the tube 30. The infusion media layer 43 (when used) is disposed about the layers 41 of reinforcing fabric. The various layers 41, 43 are limp, as best seen in FIG. 4, as they are typically formed from pliant woven reinforcing fabric. However, for clarity, the various layers 41, 43 are depicted in various other figures of the drawings as if they featured straight sections, betraying their limp nature.

Each layer 41, 43 is formed from a strip 50 in the form of a web or ribbon. The strip 50 comprises a central longitudinal portion 51 and two longitudinal marginal side portions 53 on opposed sides of the central longitudinal portion. The strip 50 is typically of unitary construction, with the central longitudinal portion and two longitudinal marginal side portions being zones of the unitary strip identified for reference purposes, rather than being distinct or separate parts. However, the strip 50 need not necessarily be of unitary constriction, and the central longitudinal portion 51 and two longitudinal marginal side portions 53 may alternatively comprise distinct or separate parts joined together. By way of example, in certain circumstances each layer may comprise sections of laminates jointed together to provide the required width of strip. This may be necessary for large diameter pipes, for instance, as the width of strip required may not be able to be produced by conventional stitching machines used to produce fabric laminates. Further, joining sections of laminates together to provide the required width of strip allows remnant material to be used to provide the strip.

Figure 5:
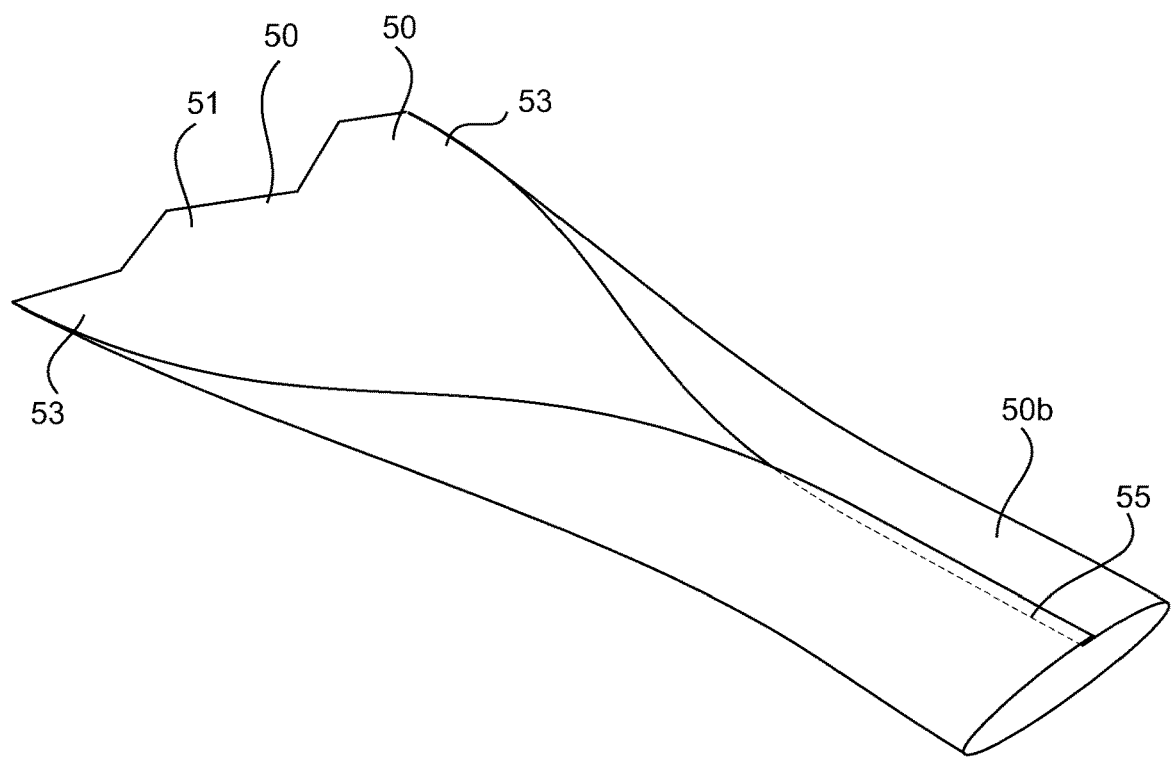
FIG. 5 is a schematic perspective view of a layer of the prefabricated tubular assembly undergoing a garniture wrapping process.

The strips 50 are each successively garniture wrapped around the inner tube 30 (and any preceding layer 41 about the inner tube 30) to assemble the strip into a tubular configuration providing the respective tubular layer 41. FIG. 5 depicted strip 50 being progressively folded upon itself from a flat configuration at section 50a into a tubular configuration at section 50b. In the tubular configuration into which section 50b is folded, the two marginal side portions 53 are disposed in overlapping relation and affixed together to provide a longitudinal lap seam 55.

Figure 6:
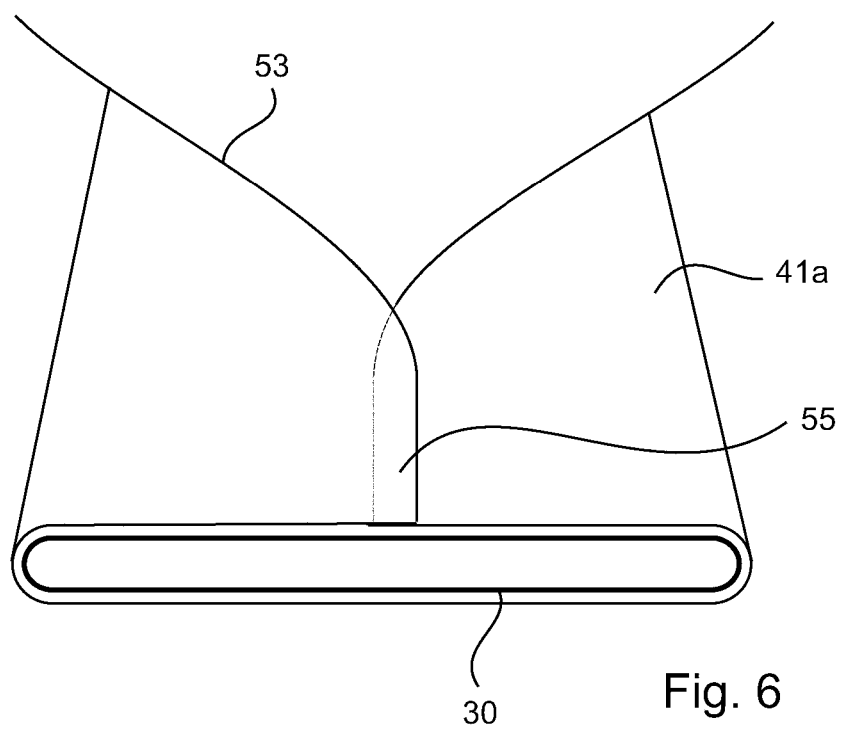
FIG. 6 is a schematic perspective view of the layer of FIG. 5 being wrapped about an inner tube to provide an innermost layer.
Figure 7:
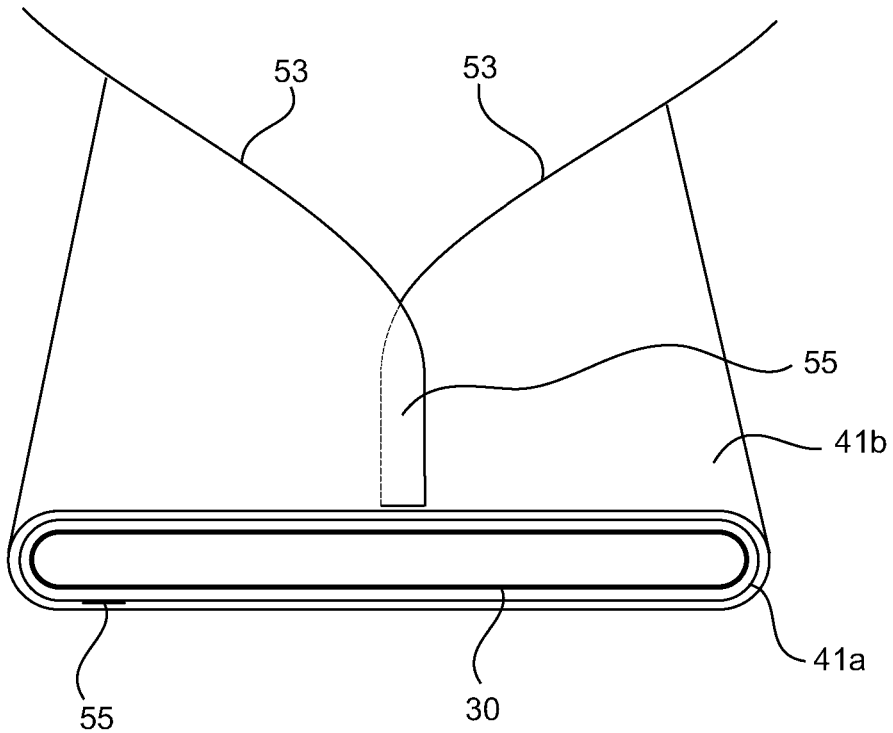
FIG. 7 is a view similar to FIG. 6 but showing a further layer being wrapped about the inner tube and the previous layer.
Figure 8:
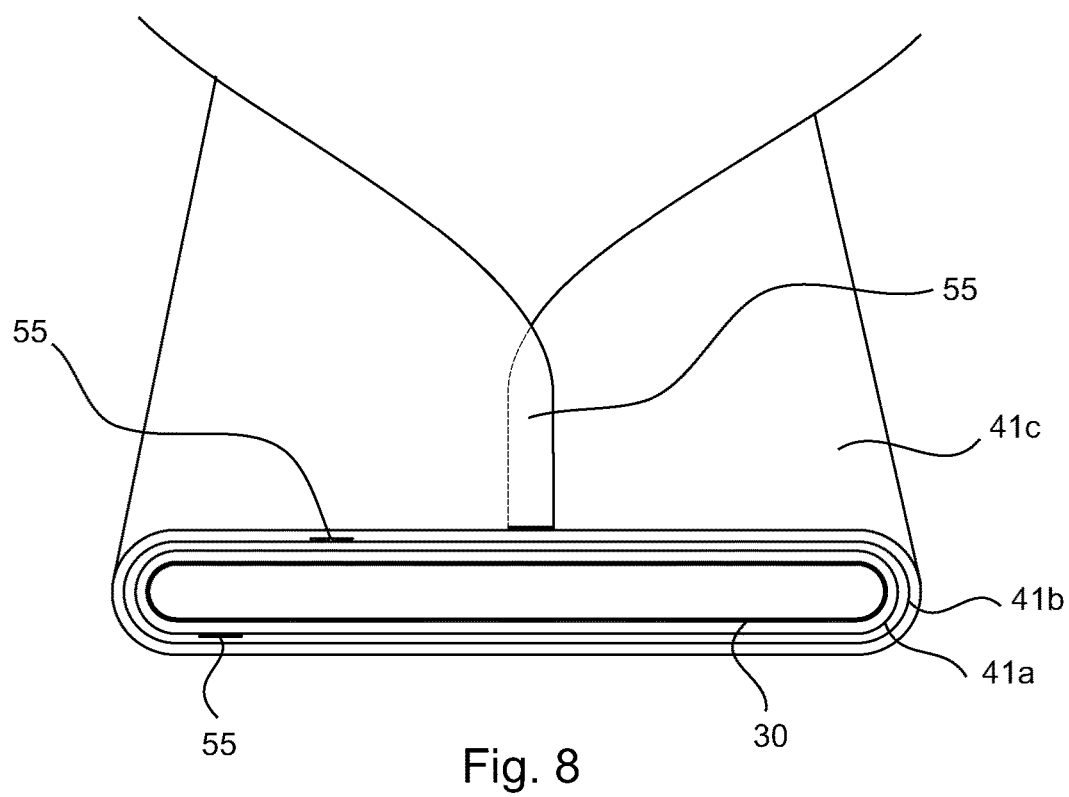
FIG. 8 is a view similar to FIG. 7 but showing a further layer being wrapped about the inner tube and the previous layer.
Figure 12:
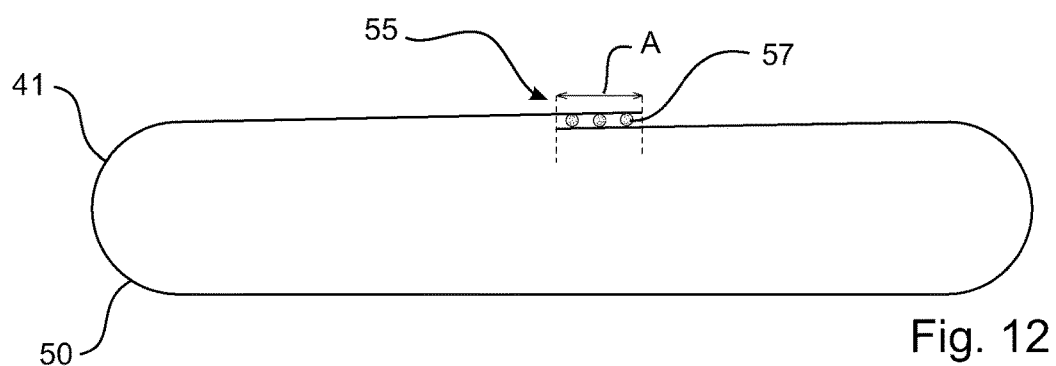
FIG. 12 is a schematic cross-sectional view of the innermost layer, illustrating in particular the extent of overlap between the two marginal side portions prior to slippage with the longitudinal lap seam.

In being garniture wrapped around the inner tube 30, each strip 50 is progressively folded upon itself along its length, maintaining the direction of the laminate in alignment with the axis of the pipe ultimately produced, with the two marginal side portions 53 being brought together into overlapping relation, as illustrated schematically in FIGS. 6 to 8. With this arrangement, each successive layer 41 is wrapped about the previous layer to provide the prefabricated tubular assembly 24; that is, the first layer 41a is wrapped about the tube 30, the next layer 41b is wrapped about preceding layer 41a, and each succeeding layer is wrapped about the preceding layer. FIG. 12 similarly shows the infusion media layer 43.

The wrapping process whereby each strip 50 is progressively folded upon itself along its length, with the two marginal side portions 53 being brought together into overlapping relation is somewhat similar to a garniture wrapping process used in the production of cigarettes.

The two marginal side portions 53 of each respective strip 50 are affixed together in any appropriate manner to provide the longitudinal lap seam 55.

The two marginal side portions 53 of each respective strip 50, or at least some of the strips, are not affixed together permanently. Rather, the marginal side portions 53 are affixed together temporarily. This is to provide for some slippage between the two marginal side portions 53 within the longitudinal lap seam 55. With this arrangement, the two marginal side portions 53 are yieldingly connected together at the longitudinal lap seam 55.

Specifically, the marginal side portions 53 may be capable of slipping laterally (tangentially) with respect to each other, after assembly of the prefabricated tubular assembly 24; for example, during deployment of the prefabricated tubular assembly 24, and more particularly during radial expansion of the concentric reinforcing fabric tubular layers 41 (which constitute the reinforcement 37) upon inflation of the tube 30. The slippage may comprise some relative movement between the two marginal side portions 53 within the longitudinal lap seam 55 or the two marginal side portions 53 detaching from each other to rupture the longitudinal lap seam 55. With such slippage, each tubular layer 41 can expand radially beyond the extent to which it could otherwise expand by virtue of inherent expansion available in the fabric from which the layer is formed. The additional radial expansion arising from slippage between the marginal side portions 53 comprising the longitudinal lap seam 55 of each layer, permits loading to be transferred successively through the layers 41 outwardly from the innermost layer 41a during expansion of the tube 30 upon inflation thereof. As the layers 41 expand, the reinforcement fibres featuring quad-axial fibre orientations progressively tension (as stated above).

The slippage may be a controlled slippage in the sense that it occurs in selected circumstances, such as radial expansion of the respective tubular layer 41.

The slippage may controlled (predetermined or designed) to ensure that loading generated by expansion of the inner tube 30 upon inflation thereof is able to be transferred successively through the surrounding layers 41 outwardly from the innermost layer 41a.

The slippage may comprise some relative movement between the two marginal side portions 53 within the longitudinal lap seam 55.

The flexible outer casing 23 may function to control the rate of radial expansion of the reinforcement.

By way of example only, the tubular layers 41 might possibly expand some 3% to 15% of their initial diameter upon inflation of the inner tube 31 within the prefabricated tubular assembly 24. Of this expansion, some 1% to 5% may be attributable to inherent expansion available within the fabric material(s) from which the layers 41 are made, with the balance being attributable to slippage between the marginal side portions 53 comprising the longitudinal lap seam 55 of each layer.

The extent of overlap between the two overlapping marginal side portions 53 within the longitudinal lap seam 55.may be of any appropriate amount, but is typically about 35 to 125 mm or 1% to 10% of the total width of the strip 50. Preferably, the extent of overlap should not be so much as to create a capstan effect which might impede slippage within the longitudinal lap seam 55.

Figure 10:
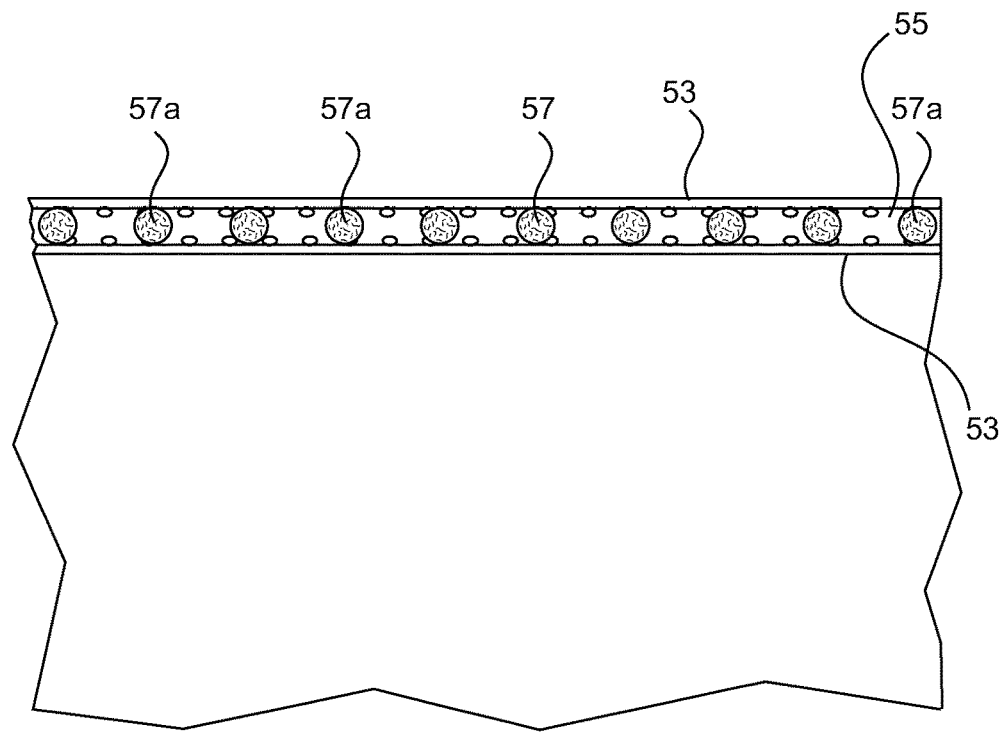
FIG. 10 is a fragmentary side view of the tubular innermost layer, illustrating in particular two marginal side portions disposed in overlapping relation and affixed together to provide a longitudinal lap seam.
Figure 13:
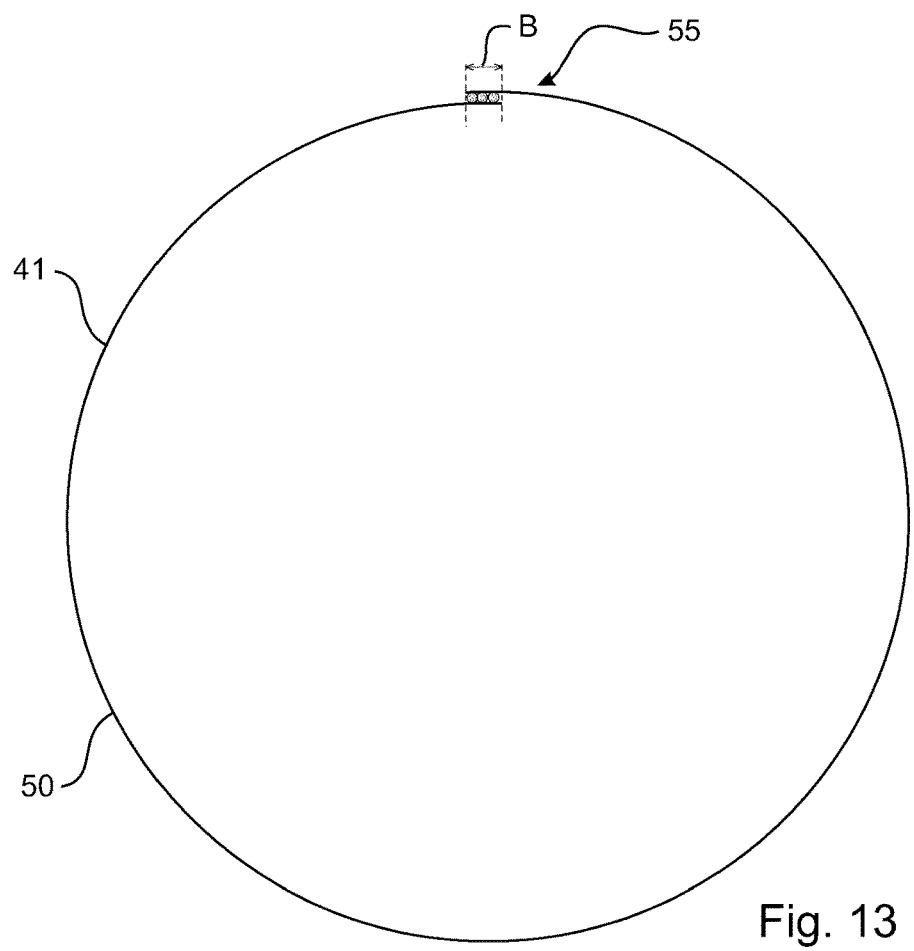
FIG. 13 is a is a view similar to FIG. 12 but showing the extent of overlap between the two marginal side portions after to slippage with the longitudinal lap seam.

In this embodiment, the two marginal side portions 53 of each strip 50 are adhered together, such as by way of adhesive bonding. The adhesive bond may be provided by an adhesive substance, such as hot melt adhesive. The adhesive bond is best seen in FIGS. 10 and 13, and is identified by reference numeral 57. While the adhesive bond 57 may optionally be continuous along the length of the longitudinal lap seam 55, it is preferably discontinuous, providing bonding attachment at spaced intervals; that is, the adhesive bond 57 preferably comprises bond sections 57a spaced at intervals along the longitudinal lap seam 55, as shown in FIG. 13. The adhesive bond 57 may comprise one or more lines of adhesive. Where there are two or more lines of adhesive, each may be discontinuous, with the discontinuities between adjacent lines of adhesive being staggered.

The adhesive bond 57 is adapted to rupture, or at least partially release, after bonding to facilitate slippage between the two marginal side portions 53, upon inflation of the tube 30. The slippage may be accommodated by flexibility within the adhesive bond 57.

The nature of the adhesive bond 57 can vary according to characteristics of the fibre materials from which the layers 41 are made. These characteristics may, for example, include: the varieties of fibre blends within the woven fabric material; the size of the fibres; the angles of the fibre rovings; the surface finish of the fibre bundles; variations in machine stitching during manufacture of the woven fabric material; and water content.

The nature of the adhesive bond 57 is preferably selected to establish a light-touch contact bond between the two marginal side portions 53 between which the bond is to be established. Desirably, the contact bond should be just sufficient to satisfy bonding requirements, without adversely wetting the fibre bundles within the two confronting marginal side portions 53. It is desirable to avoid wetting the fibre bundles with the adhesive substance, as it can be detrimental to subsequent impregnation of resin binder at the location of the bond.

The adhesive substance providing the adhesive bond 57 may comprise a polyamide, such as molten Kevlar, applied at a temperature of about 225° C. However, a variety of other types of adhesive substance may be used, as would be understood by a person skilled in the art.

The slippage within one longitudinal lap seam 55 is depicted schematically in FIGS. 12 and 13. FIG. 12 shows the longitudinal lap seam 55 in a condition prior to slippage; that is, when the longitudinal lap seam 55 is first formed by affixing the overlapping marginal edge portions 53 of the strip 50 together. The extent of overlap is identified by reference character A. FIG. 13 shows the longitudinal lap seam 55 in a condition following slippage, with a reduced amount of overlap between the marginal edge portions 53. The extent of overlap after slippage is identified by reference character B. The extent of overlap between the two overlapping marginal side portions 53 after slippage may be of any appropriate amount, but is typically at least 10 times the thickness of the strip (laminate) from which the layer is formed. This is to ensure that there is sufficient overlap for transfer of the shear loads; for example, if the strip (laminate) is 1.8 mm thick, an overlap of 18 mm should be maintained at the longitudinal lap seam 55 of each layer to effectively transfer the shear loads.

By way of example only, the amount of overlap may be about 30 to 125 mm when the longitudinal lap seam 55 is first formed, and about 15 to 35 mm following slippage within the longitudinal lap seam.

The integrity of the radially outer portion 22 of the composite pipe 20 ultimately formed using the prefabricated tubular assembly 24 is not compromised by slippage within the longitudinal lap seam 55 of each layer 41, or rupturing or partial release, of the adhesive bond 57 within the longitudinal lap seam 55. This is because the layers 41 are ultimately impregnated with resin binder which cures, encasing the layers. The longitudinal lap seams 55 are intended to maintain the various layers 41 in the tubular arrangement concentrically one about another during manufacture and during deployment of the prefabricated tubular assembly 24. Subsequent slippage within the longitudinal lap seams 55 enables the tubular layers 41 to expand radially beyond the extent to which they could each otherwise do so. In this way, loading generated by expansion of the tube 30 upon inflation thereof can be transferred successively through the surrounding layers 41 outwardly from the innermost layer 41a, progressively tensioning the reinforcement fibres within the material from which the layers 41 are formed (e.g the quad-axial fibre orientations).

Figure 3:
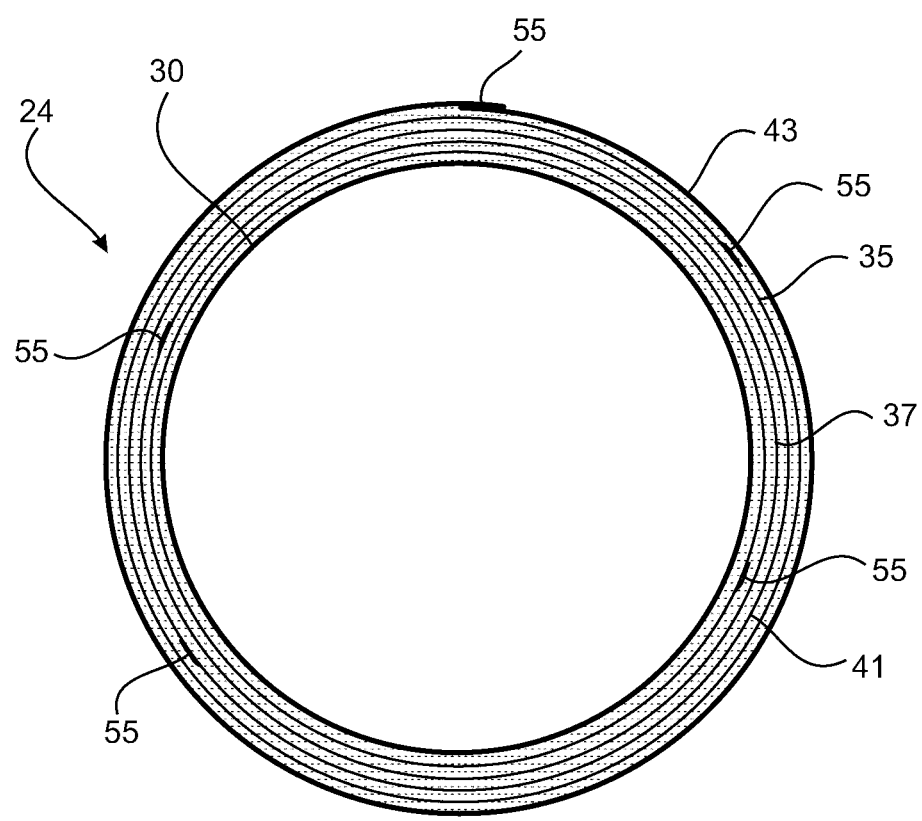
FIG. 3 is a view similar to FIG. 2, except that the prefabricated tubular assembly is shown in an expanded condition.
Figure 9:
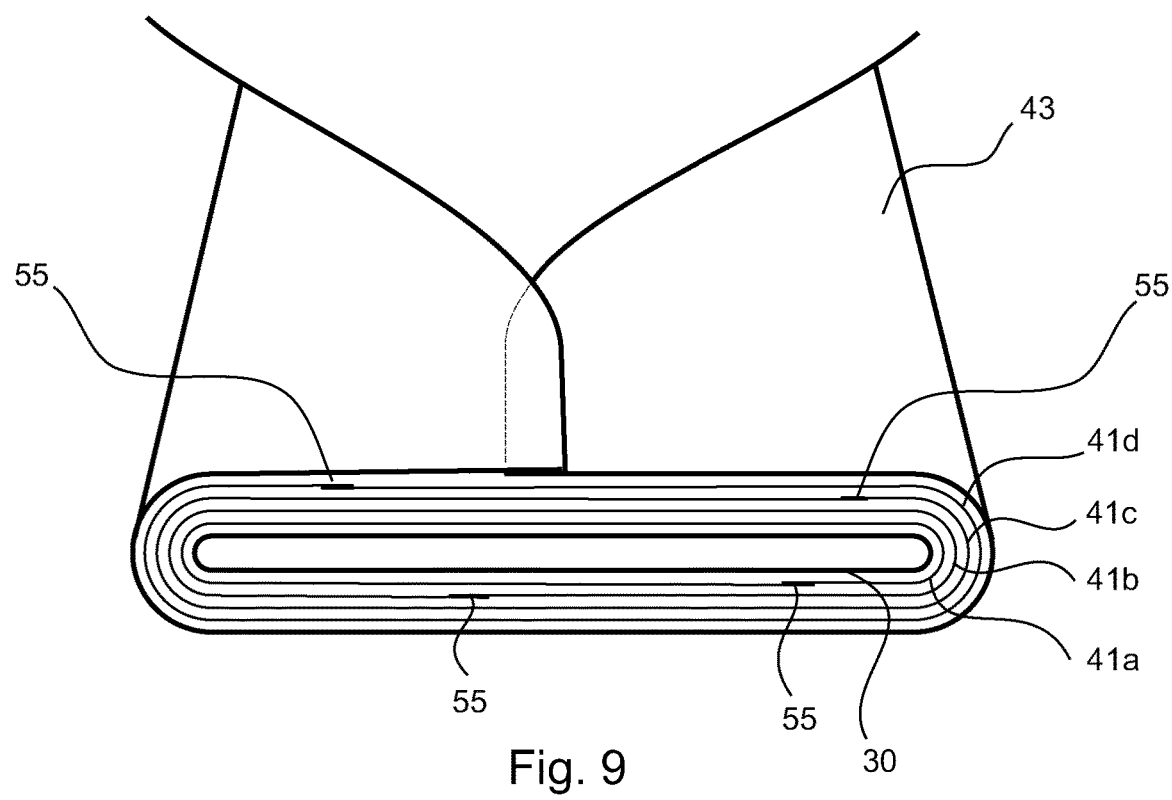
FIG. 9 is a view similar to FIG. 8 but showing an infusion media layer being wrapped about the inner tube and the previous layer.
Figure 11:
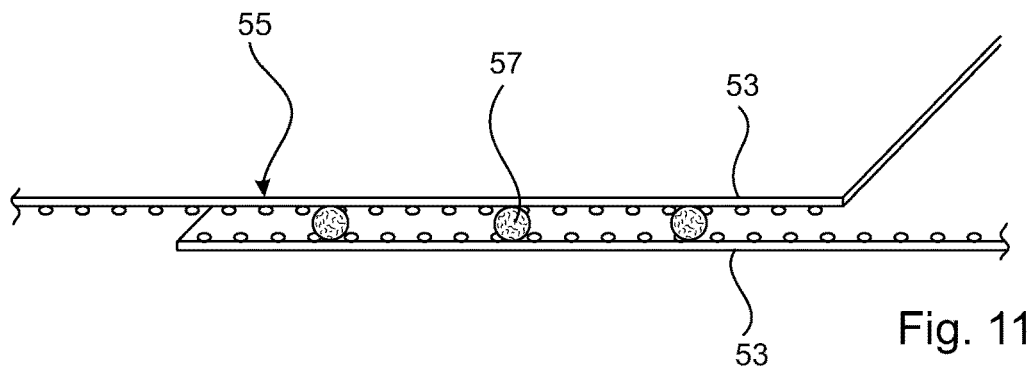
FIG. 11 is a fragmentary perspective view of the two marginal side portions disposed in overlapping relation and affixed together to provide the longitudinal lap seam.

The longitudinal lap seams 55 of adjacent layers 41 are angularly offset in relation to each other. This can be seen in FIGS. 3 and 9, with the latter showing the longitudinal lap seams 55 of adjacent layers 41a, 41b and 41c are in angularly spaced relation. This is to distribute the longitudinal lap seams 55 around the reinforcement 37 and avoid bulges or excess thickening of the prefabricated tubular assembly 24

Referring now to FIGS. 14 to 25, there is shown one form of assembly apparatus 100 for production of the prefabricated tubular assembly 24.

Figure 14:
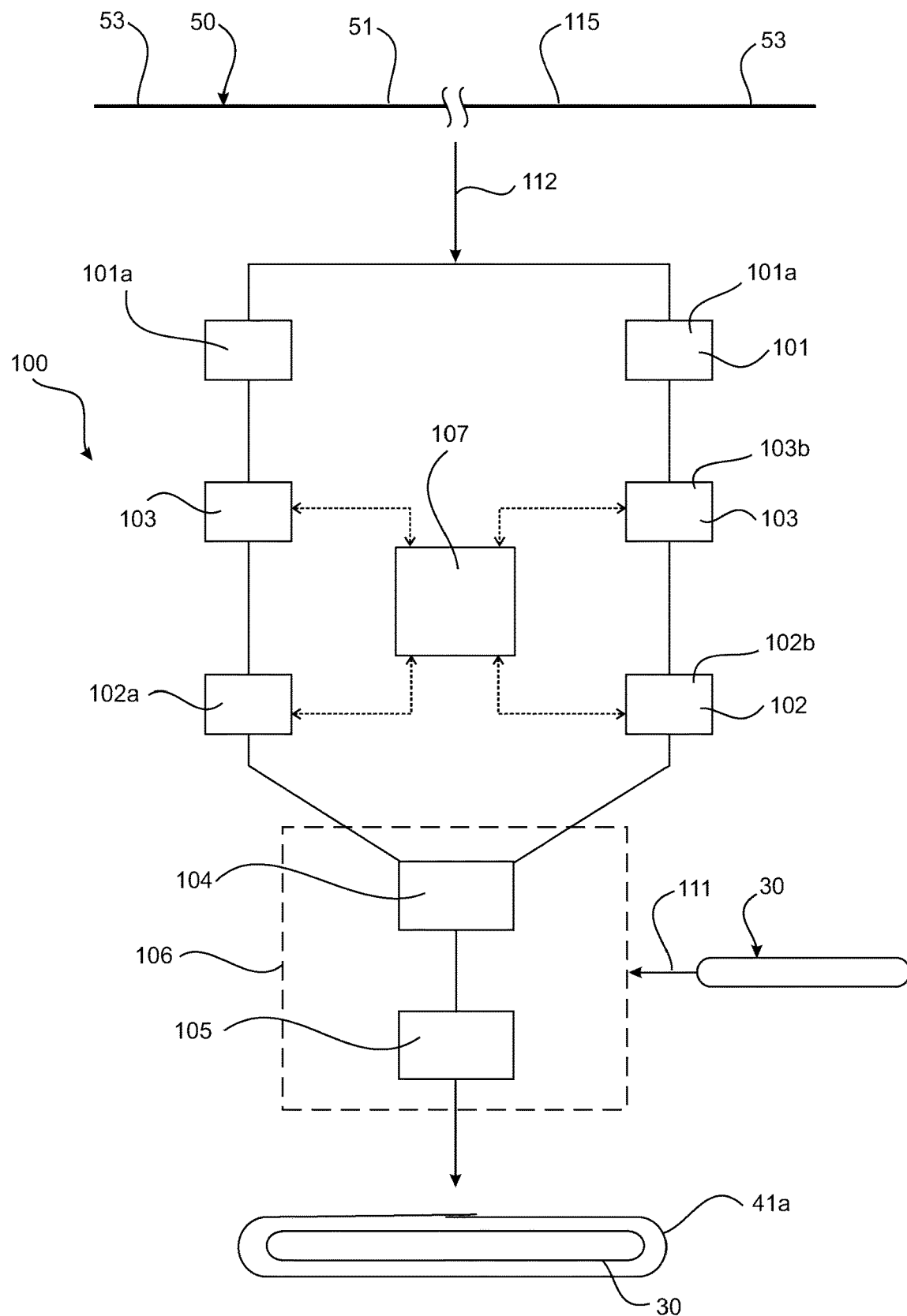
FIG. 14 is a schematic view depicting various operations performed to install the innermost layer about the inner tube.

The prefabricated tubular assembly 24 is produced by firstly wrapping a first layer 41a (which constitutes the innermost layer) about the tube 30. A second layer 41b is then wrapped about the innermost layer 41a. This is followed by wrapping of a third layer 41c about the second layer 41b. The process is repeated until all required layers 41 are in position. Additionally, if infusion media is to be provided, the infusion media layer 43 is wrapped about previously installed concentric layers 41. FIG. 14 only depicts wrapping of the innermost layer 41a about the inner tube 30.

This production of the prefabricated tubular assembly 24 may involve various passes of the tubular assembly 24 under construction through the apparatus 100, with each pass installing the next layer. Alternatively, the apparatus 100 may have a plurality of stations in series, with each station installing a respective one of the various layers configured about the circumference such that the overlaps which provide the longitudinal lap seams are evenly distributed about the circumference.

The assembly apparatus 100 will now be described with reference to installation of the innermost layer 41a about the tube 30. However, it should be understood that a similar procedure is involved in installation of any subsequent layer (either layer 41 of reinforcing fabric, or the infusion media layer 43) about that portion of tubular assembly 24 which has been previously assembled through installation of one or more preceding layers.

The tube 30 is prefabricated prior to being used in the production of the assembled tubular structure 40.

The various operations performed by the assembly apparatus 100 to install the innermost layer 41a about the inner tube 30 are depicted schematically in FIG. 14, featuring a folding station 101, a steering station 102, a monitoring station 103, an overlapping station 104, a bonding station 105, and an assembly station 106. The assembly station 106 is integrated with the overlapping station 104 and the bonding station 105.

Operations at the steering station 102 and a monitoring station 103 may be under the control of a control system 107 such as a computer control system. The control system 107 may also control other aspects of the assembly apparatus 100.

The inner tube 30 advances along a first path 111 towards the assembly station 106.

The layer 41a is formed from strip 50 in the form of a web 115 advancing along a second path 112 towards the folding station 101. The web 115 may be stored on a reel (not shown) from which it can progressively unwind and advance towards the folding station 101.

In advancing along the second path 112, the web 115 providing the strip 50 is progressively folded from a flat condition into a tubular configuration with the two longitudinal marginal side portions 53 in overlapping relation, as illustrated in FIG. 8 discussed previously. Various guide elements are provided along the path 112 of movement of the web 115 for progressively causing the strip 50 to assume the tubular configuration at section 50b with the two longitudinal marginal side portions 53 in overlapping relation. The guide elements may include turn elements about which the web 115 is turned for directional control, and a profiling structure for causing the web 115 to fold longitudinally to progressing urge the central portion 51 to assume an arcuate profile and move the two longitudinal marginal side portions 53 inwardly towards each other. The folding station 101 comprises two sections 101a and 101b, each associated with one of the two longitudinal marginal side portions 53 of the strip 50.

Figure 15:
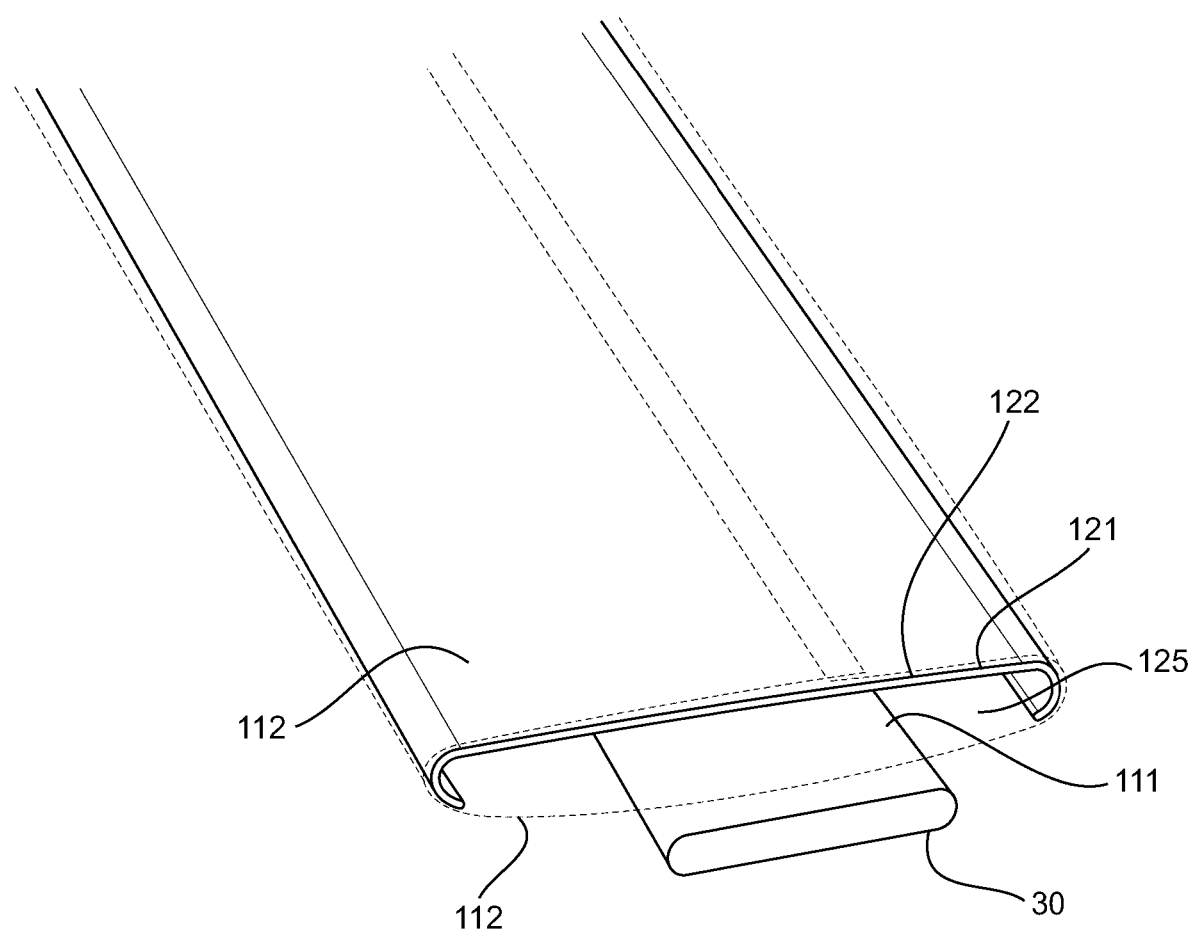
FIG. 15 is a schematic perspective view of part of assembly apparatus provided for production of the prefabricated tubular assembly.

The assembly apparatus 100 comprises a plate structure 121 defining a wall 122, as shown in FIG. 15. In the arrangement shown, the first path 111 passes below the wall 122 and the second path 112 surrounds the wall 122.

The assembly apparatus 100 further comprises a base portion (not shown) mounted below the plate structure 121.

The base portion and the plate structure 121 cooperate to define a space 125 through which the first path 111 extends. With this arrangement, the tube 30 passes through the space 125, as depicted schematically in FIG. 15 which also shows the tube 30 exiting the space.

Figure 19:
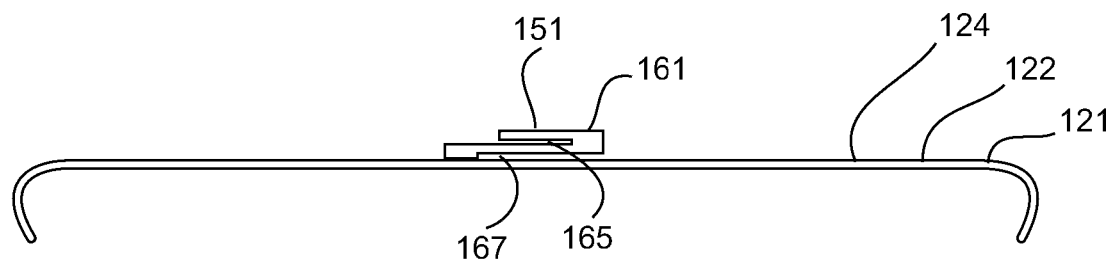
FIG. 19 is an end view of the arrangement shown in FIG. 18.

As the tube 30 passes through the space 125, the strip 50 is wrapped around the tube 30 to form the innermost layer 41a, as shown schematically in FIG. 19.

Figure 16:
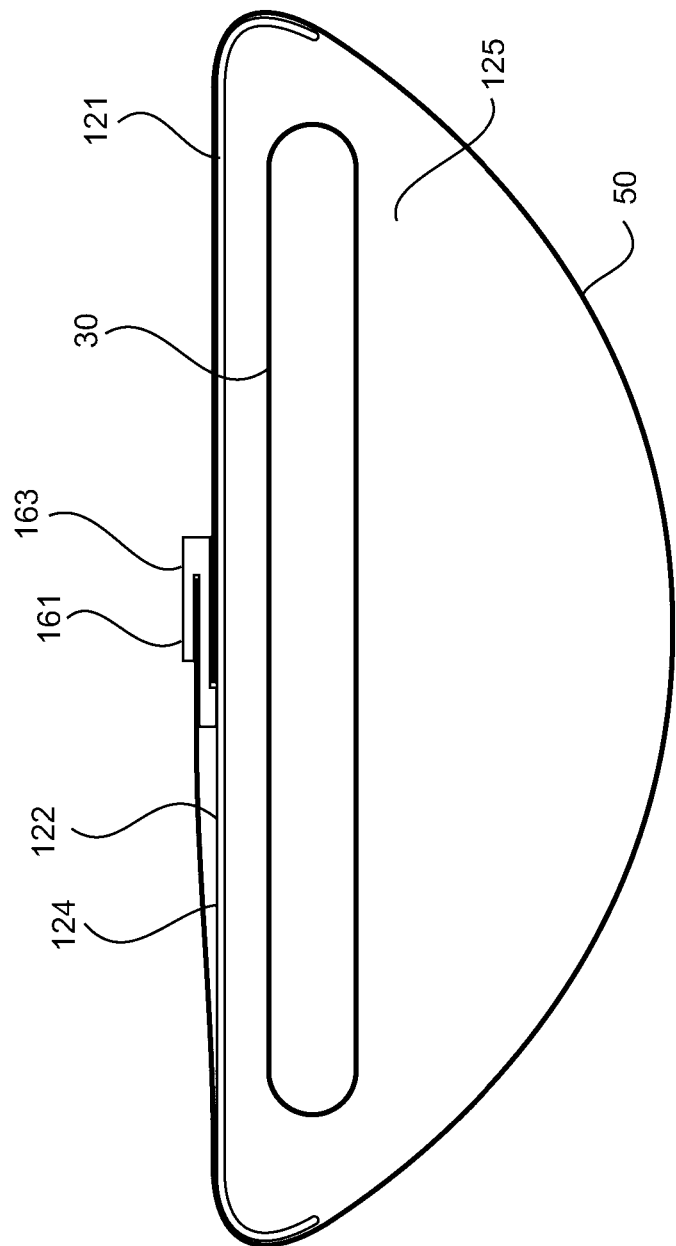
FIG. 16 is an end view of part of assembly apparatus provided for production of the prefabricated tubular assembly.
Figure 17:
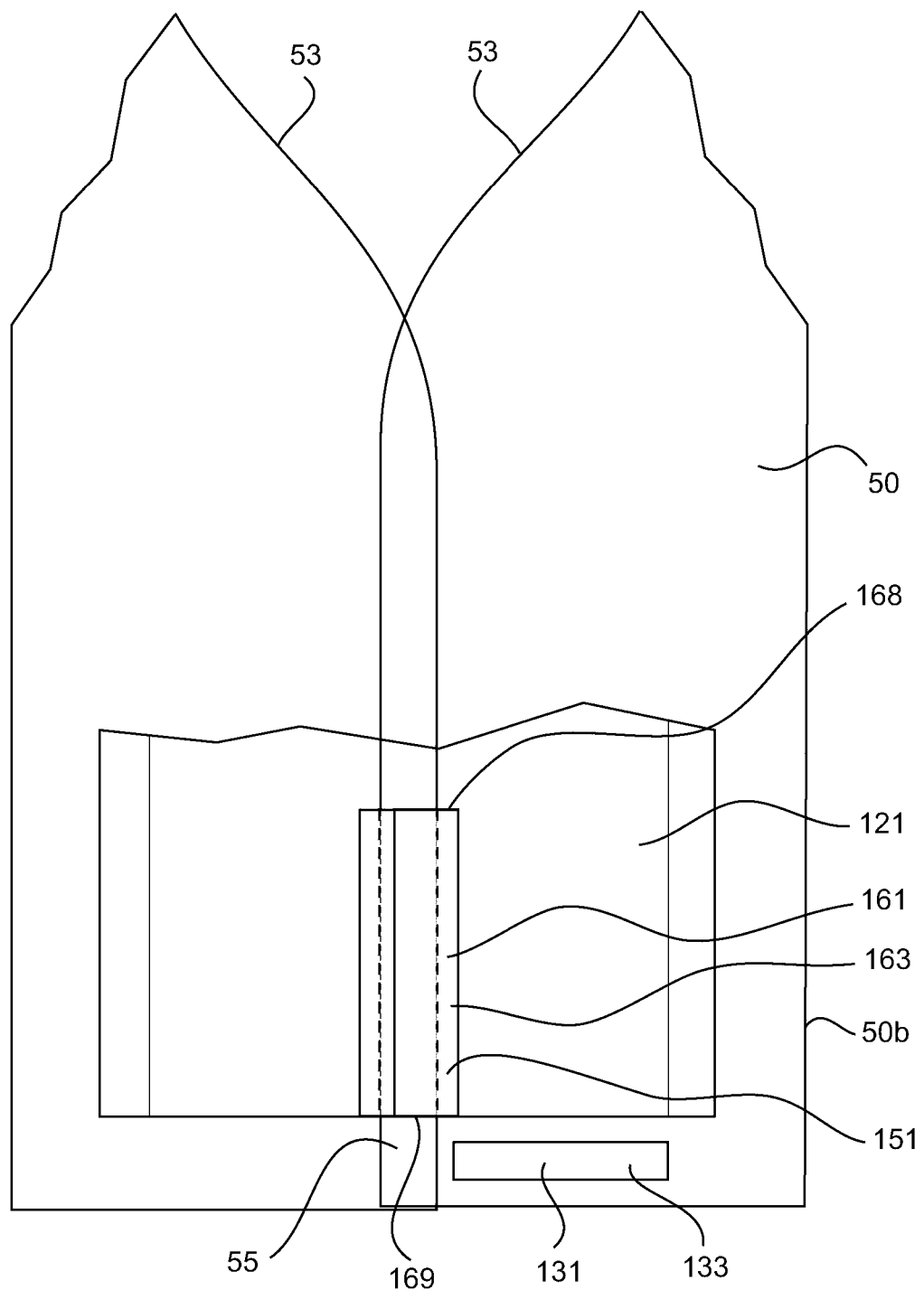
FIG. 17 is a plan view of the arrangement shown in FIG. 16.
Figure 18:
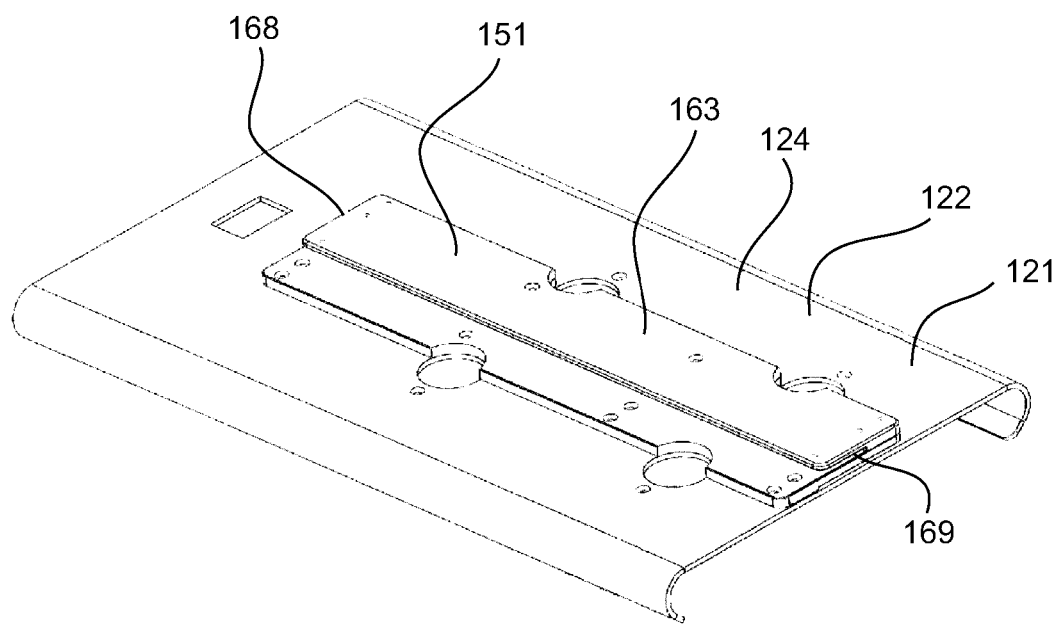
FIG. 18 is a further schematic perspective view of part of assembly apparatus provided for production of the prefabricated tubular assembly, illustrating in particular an alignment device comprising a guide mounted on a plate structure.

More particularly, the strip 50 progressively assumes the tubular configuration as it approaches the assembly station 106. Upon arrival of the strip 50 at the assembly station 106, the tubular configuration encircles the base and the plate structure 121, and thus also the tube 30 passing through the space 125, as best seen in FIGS. 15 and 16. With this arrangement, the innermost layer 41a is installed completely about the tube 30 upon the assembly exiting from the space 125.

The bonding station 105 comprises a system 131 for affixing the two longitudinal marginal side portions 53 together in overlapping relation to complete assembly the strip 50 into a tubular configuration to provide the innermost layer 41a about the tube 30.

The system 131 for affixing the two longitudinal marginal side portions 53 together in overlapping relation may take any appropriate form. In the arrangement shown, the system 131 comprises apparatus 133 for applying hot melt adhesive between the overlapping longitudinal marginal side portions 53 to establish adhesive bonding therebetween (e.g. the adhesive bond 57). The apparatus 133 may comprise an delivery device for spraying or otherwise propelling adhesive between the overlapping longitudinal marginal side portions 53 to effect adhesive bonding.

The wall 122 at the assembly station 106 presents a wall surface 141 along which the two longitudinal marginal side portions 53 slide, and a press (not shown) may optionally be provided for pressing the two longitudinal marginal side portions 53 together against the wall surface to establish adhesive bonding therebetween. Consistent with the requirement for a light-touch contact bond between the two marginal side portions 53 between which the bond is to be established, the press may be configured for lightly pressing the two portions 53 together. The press may comprise a press roller system, with the overlapping marginal side portions 53 passing between the press roller system and the wall surface. The press may also incorporate a cooling means for chilling the adhesive and or the roller to bring the adhesives temperature down below the molten state to achieve the bond quickly.

The apparatus 133 for applying hot melt adhesive between the overlapping longitudinal marginal side portions 53 may be mounted on a lateral rail system (not shown), permitting selective positional adjustment, as may be required.

The assembly apparatus further comprises an alignment system 151 for aligning the two longitudinal marginal side portions 53 in overlapping relation prior to being affixed together. The alignment system 151 comprises an alignment device 161. The alignment device 161 is provided at or adjacent the overlapping station 104.

Figure 20:
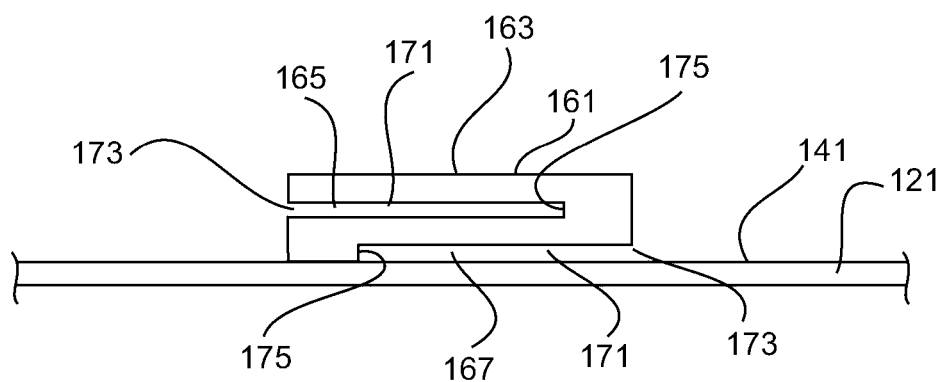
FIG. 20 is an end view of the guide on an enlarged scale.
Figure 21:
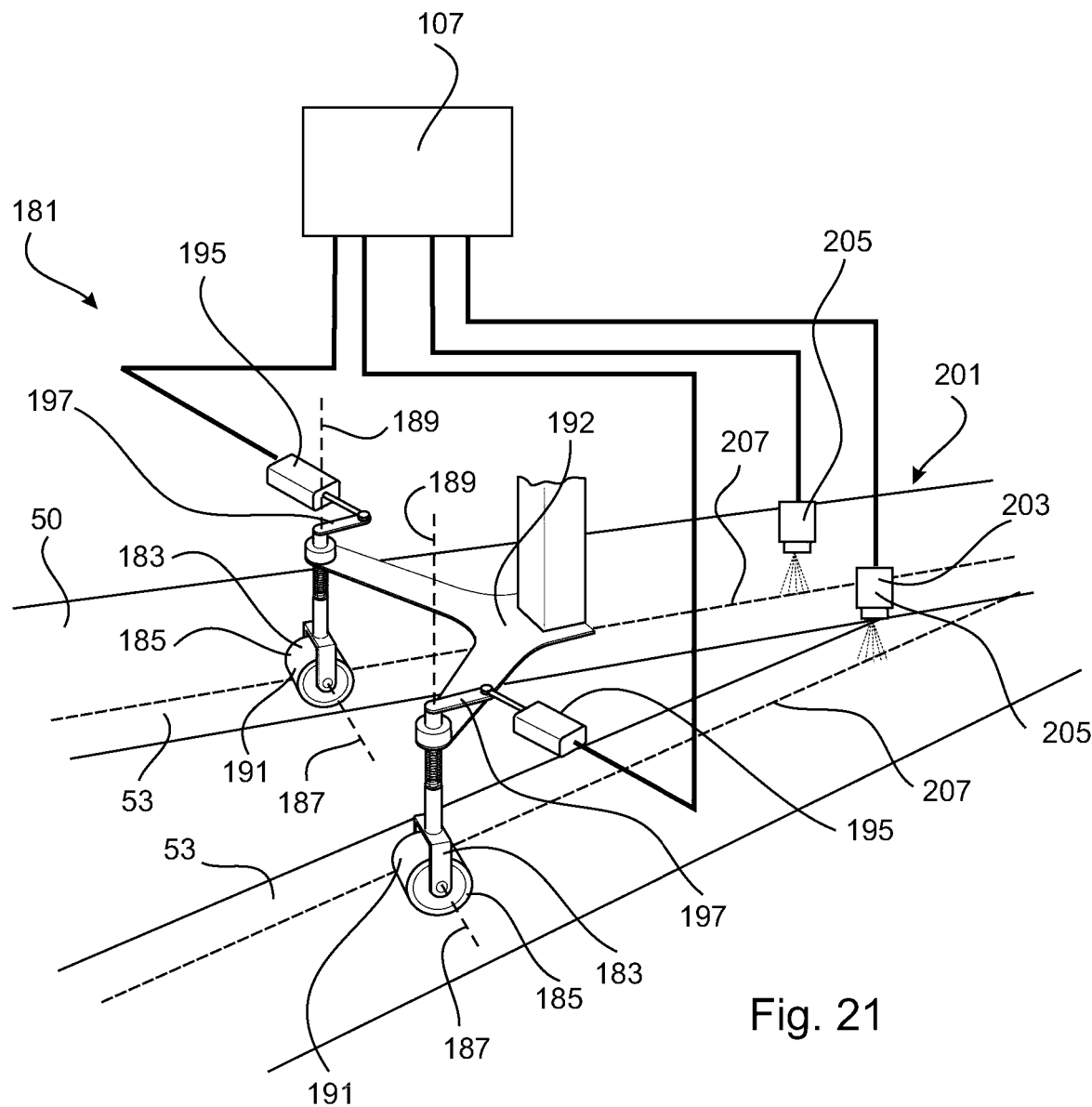
FIG. 21 a further schematic perspective view of part of assembly apparatus provided for production of the prefabricated tubular assembly, illustrating in particular a guidance system for guiding the strip to maintain the two longitudinal marginal side portions in correct alignment with the guide.

The alignment device 161 comprise a guide 163 mounted on the plate structure 121, as shown in FIGS. 16 to 20. In FIG. 20, the guide 163 is depicted schematically in an enlarged condition.

In the arrangement shown, the guide 163 comprises two guide plates fitted together. The guide 163 defines two longitudinal guide paths 165, 167, each having an entry end 168 and an exit end 169. Each guide path 165, 167 is adapted to receive a respective one of the two marginal side portions 53 of the strip 50 at the entry end 168. More particularly, the two longitudinal marginal side portions 53 pass along the guide paths 165, 167 from the entry end 168 to the exit end 169 as the strip 50 advances along the second path 112 at the assembly station 106. The two guide paths 165, 167 each comprise a respective longitudinal slot 171 having one longitudinal side 173 open and the other longitudinal side 175 closed. The two slots 171 are disposed one adjacent the other and in opposed relation, whereby each slot configured to receive a respective one of the two longitudinal marginal side portions 53 for sliding movement therealong when in overlapping relation. The two longitudinal marginal side portions 53 are received in the guide paths 165, 167, with the free edge of each longitudinal marginal side portion 109 in abutting the closed side 175 of the respective slot 171. In this way, the overlapping longitudinal marginal side portions 53 can be correctly aligned one with respect to the other for affixing together upon leaving the guide 163 at the exit ends 169 of the guide paths 165, 167.

The assembly apparatus 100 further comprises a guidance system 181 for guiding the strip 50 for maintaining the two longitudinal marginal side portions 53 in correct alignment with the guide 163; that is, to maintain the two longitudinal marginal side portions 53 correctly positioned within the guide paths 165, 167 defined by the opposed slots 171 within the guide 163.

The guidance system 181 comprise at least one steering device 183 in interacting with the strip 50 adjacent each longitudinal marginal side portion 53, as shown in FIGS. 21 to 24. The guidance system 181 is provided at the steering station 102. The steering station 102 comprises two sections 102a and 102b, each associated with one of the two longitudinal marginal side portions 53 of the strip 50. With this arrangement, at least one steering device 183 is provided at each of the two sections 102a, 102b of the steering station 102.

Each steering device 183 is operable to interact with the respective longitudinal marginal side portion 53 in a manner which either (a) enables the longitudinal marginal side portion to continue to travel along its current path when in the correct alignment or (b) causes the longitudinal marginal side portion 53 to shift laterally when there is some misalignment and correction is required. In the event that the longitudinal marginal side portions 53 are not correctly aligned to establish the required overlap therebetween, positional adjustments can thus be made to either one or both of them as necessary to correct the misalignment. The misalignment may, for example, result in either one or both of the longitudinal marginal side portions 53 are not being in correct alignment with guide 163 such that the free edge of the longitudinal marginal side portion 109 is not positioned to slidingly abut the closed side 175 of the respective slot 171 as required.

Each steering device 183 is operable to interact frictionally with the respective longitudinal marginal side portion 53 to effectively steer the longitudinal marginal side portion 53 as it moves past the guide device.

Figure 22:
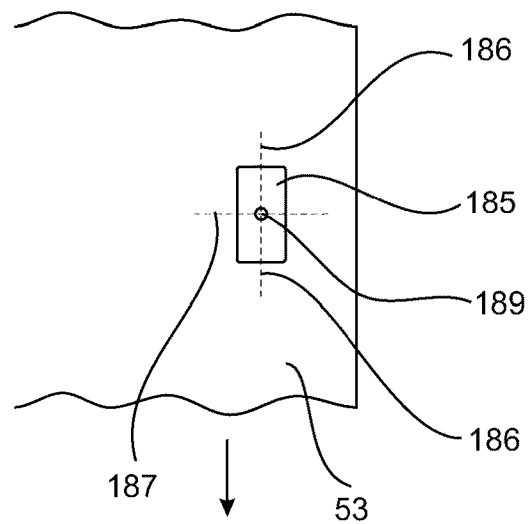
FIG. 22 is a schematic view illustrating operation of the guidance system in one condition.
Figure 23:
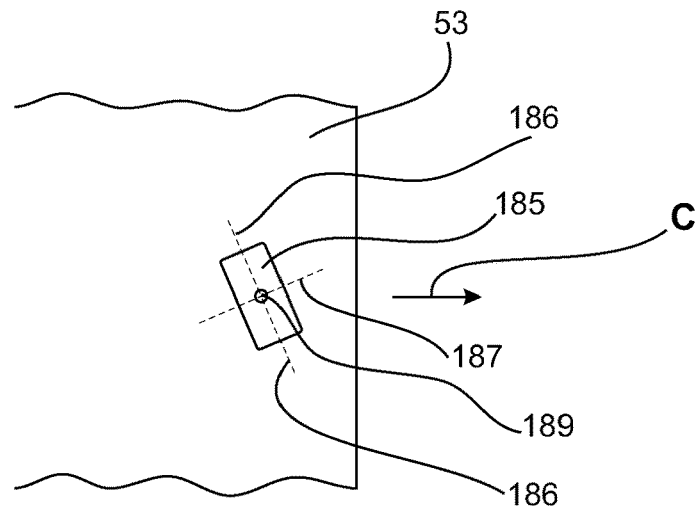
FIG. 23 is a schematic view illustrating operation of the guidance system in another condition.
Figure 24:
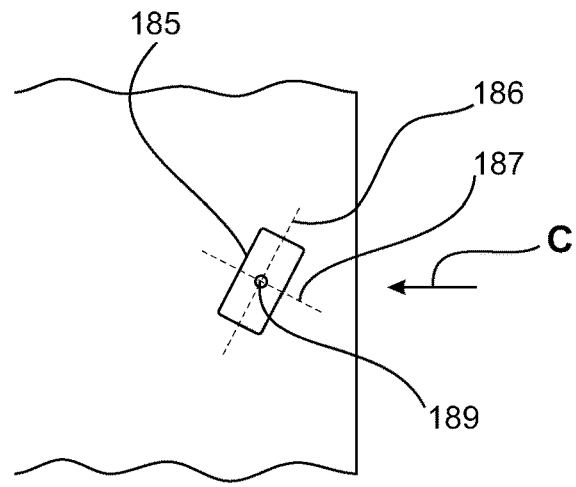
FIG. 24 is a schematic view illustrating operation of the guidance system in another condition.

More particularly, each steering device 183 comprises a steerable element 185 which presents a line of action 186 at the interface with the respective longitudinal marginal side portion 53, as depicted schematically in FIGS. 22, 23 and 24. In circumstances where the line of action 186 of the steerable element 185 is aligned with the direction of travel of the longitudinal marginal side portion 53, the steering device 183 has not effect on the travel of the longitudinal marginal side portion. If, however, the line of action 186 of the steerable element 185 is varied (by a steering action imposed upon the steerable element) such that it is angled to the direction of travel of the longitudinal marginal side portion 53, the steering device 183 has a corrective effect on the direction of travel of the longitudinal marginal side portion. In effect, the steering device 183 has a steering effect on the advancing the longitudinal marginal side portion, causing the longitudinal marginal side portion 53 to shift laterally when correction is required.

In the arrangement shown in FIGS. 21 to 24, each steering device 183 comprises a steerable element 185 in the form of a guide wheel 185 having a rolling axis 187 (axis of rotation) and also a steering axis 189. The steering axis 189 is normal to the rolling axis 187 and also normal to the path of travel of the respective longitudinal marginal side portion 53 as the latter slides upon the wall surface 141 of the plate structure 121. With this arrangement, the steering axis 189 is also normal to the plane of wall surface 141 of the plate structure 121. The guide wheel 185 presents a rolling surface 191 which contacts the advancing longitudinal marginal side portion 53. The line of action 186 of the guide wheel 185 is at the interface between the rolling surface 191 and the advancing longitudinal marginal side portion 53, tangential to the rolling surface 191 and normal to the rolling axis 187.

The guide wheels 185 mounted on a chassis 192 above the plate structure 121.

The guide wheels 185 are each rotatable about a respective rolling axis 187, with the rolling axis being normal to the direction of travel of the respective longitudinal marginal side portion 109 along the guide paths 165, 167 when they are correctly aligned. The guide wheels 185 are also each steerable about steering axis 189 normal to both the rolling axis 187 of the respective guide wheel and the direction of travel of the two longitudinal marginal side portions 109 along the guide paths 165, 167 when they are correctly aligned.

If either one (or both) of the two longitudinal marginal side portions 53 moves out of the correct alignment, and corrective action is thereby required, the guide wheel(s) 185 associated with the particular longitudinal marginal side portion 53 requiring correction can be rotated about the steering axis 189 to vary the angle of its respective rolling axis 187 (and hence the line of action 186) with respect to the direction of travel of the particular longitudinal marginal side portion 53 With this arrangement, the steered guide wheel 185 interacts with the moving longitudinal marginal side portion 53 with which it is in contact, with reaction forces therebetween causing lateral displacement of the longitudinal marginal side portion 53 and thereby correcting the misalignment.

Figure 25:
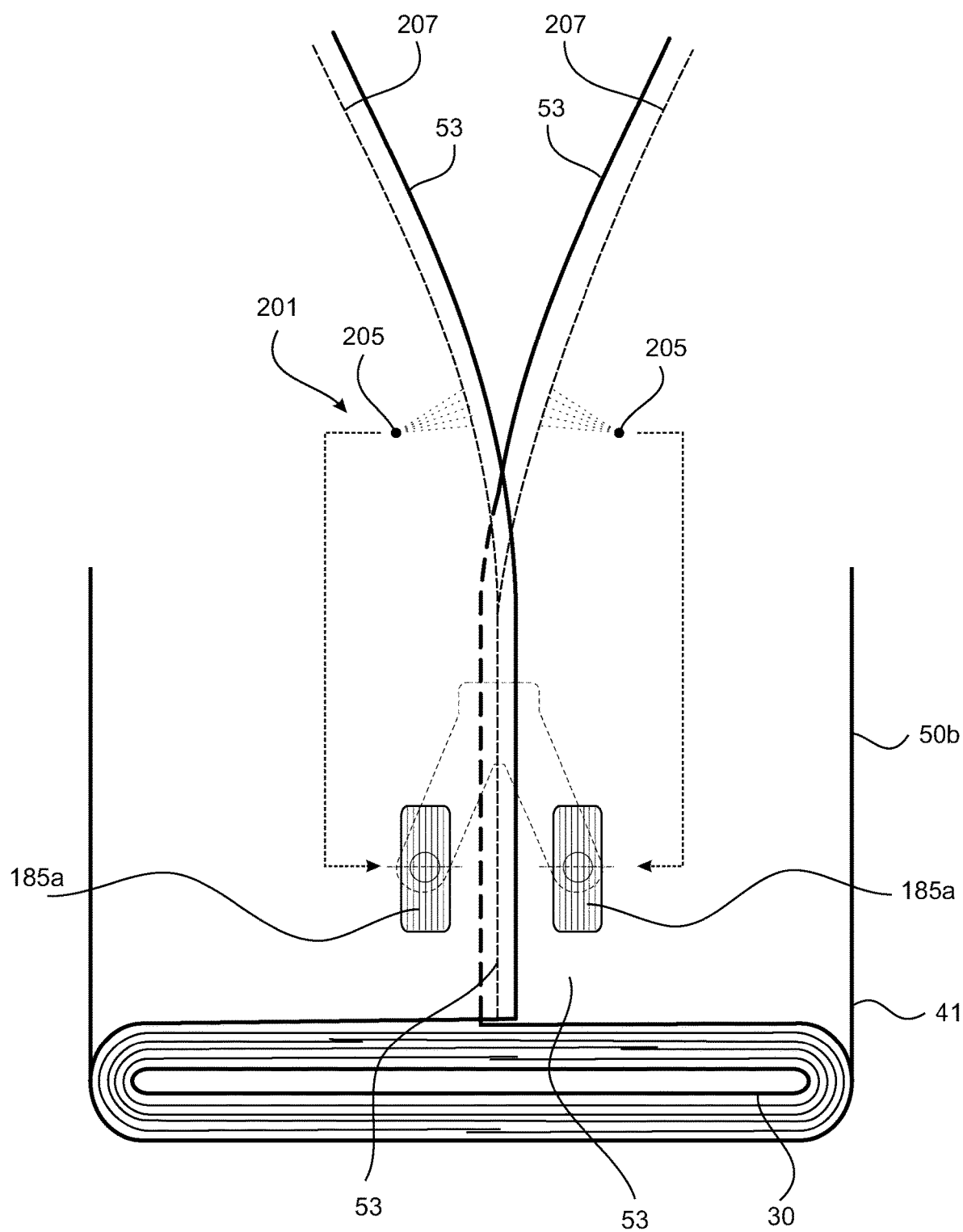
FIG. 25 a schematic view illustrating a variation of the guidance system.

Operation of the guidance system 181 is depicted schematically in FIGS. 25, 26 and 27. FIG. 22 depicts a condition in which the line of action 186 of the steerable element 185 (the guide wheel) is aligned with the direction of travel of the longitudinal marginal side portion 53. In this condition, the steering device 183 has not effect on the travel of the longitudinal marginal side portion; that is, the longitudinal marginal side portion 53 continues to travel in a direction aligned with the line of action 186 of the steerable element 185. FIG. 23 depicts a condition in which travel of the longitudinal marginal side portion 53 requires correction. In order to provide the correction, the steerable element 185 (the guide wheel) is rotated about its steering axis 189 such that the line of action 186 is angled to the direction of travel of the longitudinal marginal side portion 53. When so angled, the steering device 183 has a corrective effect on the direction of travel of the longitudinal marginal side portion. In effect, the steerable element 185 has a steering effect on the advancing longitudinal marginal side portion, causing the longitudinal marginal side portion 53 to shift laterally in the required direction as determined by the angular disposition of the line of action 186. The longitudinal marginal side portion 53 shifts laterally by sliding upon the wall surface 144 of plate structure 121 under the influence of the steerable element 185. FIG. 24 is a view similar to FIG. 23, but depicting correction in the other direction.

In FIGS. 23 and 24, arrows identified by reference character C depict the lateral shift which the longitudinal marginal side portion 53 undergoes under the influence of the steerable element 185.

Steering is provided by way of steering motors 195 mounted on the chassis 192 and operatively coupled to the steerable elements 185. The steering motors 195 may comprise servo motors or linear motors. The steering motors 195 may be operatively connected to the respective guide wheel(s) 185 by steering control rods 197. Steering is controlled by control system 107.

In this embodiment, the guide wheels 185 are freely rotatable. In other words, the guide wheels 185 rotate merely through interaction with the strip 50 as the two longitudinal marginal side portions 53 travel along the guide paths 165, 167; that is, they are not otherwise powered. In another arrangement, the guide wheels 185 may be powered, and thereby operable to impose traction and/or drag on the strip 50. In yet another arrangement, the guide wheels 185 may have a braking or retardation feature for imposing drag on the strip 50.

The steerable elements 185 need not necessarily be in the form of guide wheels, and other arrangements are contemplated. By way of example, the steerable elements 185 may be in the form of rollers (including in particular elongate rollers), and other forms of cyclically movable elements such as endless track mechanisms. Further, the steerable elements 185 need not necessarily be in the form of cyclically movable elements such as wheels, rollers and endless track mechanisms. The steerable elements 185 may, for example, be configured as skids in sliding contact with the strip 50 as the two longitudinal marginal side portions 53 travel along the guide paths 165, 167. The skids would each present a line of action 186, typically aligned with a longitudinal axis of the skid. Further, the skids would each be rotatable about a steering axis for varying the alignment of the line of action (e.g. the longitudinal axis of the skid) to effect a steering action as previously described.

The guidance system 181 further comprises a monitoring system 201 for monitoring travel of the strip 50 through the assembly station 106. More particularly, the monitoring system 201 is operable to track the travel of the two longitudinal marginal side portions 53 in assuming the overlapping condition that is required for affixing them together. In this embodiment, the monitoring system 201 is operable to track travel of the two longitudinal marginal side portions 53 relative to the alignment device 161. In the event of an out-of-alignment condition being detected, the monitoring system 201 is operable to initiate remedial action; for example, through initiating operation of the steering facility for the guide wheels 185 via the control system 107. Operation of the steering facility is initiated though operation of either one or both of the steering motors 195, as necessary.

The monitoring system 201 is provided at the monitoring station 103. The monitoring station 103 comprises two sections 103a, 103b, each associated with one of the two longitudinal marginal side portions 53 of the strip 50. With this arrangement, the two longitudinal marginal side portions 53 of the strip 50 are monitored individually In this embodiment, the monitoring system 201 comprises an optical tracking system 203, although of course other tracking systems may be deployed (such as, for example, a tactile tracking system). The optical tracking system 203 comprises two optical sensors 205 such as cameras, one at each section 103a, 103b of the monitoring station 103. Each optical sensor 205 is operable to track a feature of the strip 50 indicative of the alignment of the respective longitudinal marginal side portion 53 In this embodiment the feature of the strip 503 being tracked is a marking 207, such as a line, applied to the strip 50. With this arrangement, there may be two markings 207 (e.g. lines) applied to the strip 50, one on or adjacent each longitudinal marginal side portion 53. The markings 207 (lines) may applied to the strip 50 in any appropriate way; for example, during production of the web 115 which provides the strip, during winding of the web onto a storage reel, or during travel of the web 115 along the second path 112 to the assembly station 101. In this embodiment, the two marking 207 are applied as lines to the web 115 by a printing process. More particularly, the lines are applied by two printers (not shown), each operable to print a continuous line onto the strip 50 along or adjacent a respective one of the longitudinal marginal side portions 53. The printed lines extend parallel to the adjacent longitudinal side edges of the strip 53. The markings 207 may of course take other forms. Further, the markings 207 may be applied in ways other than printing.

Figure 33:
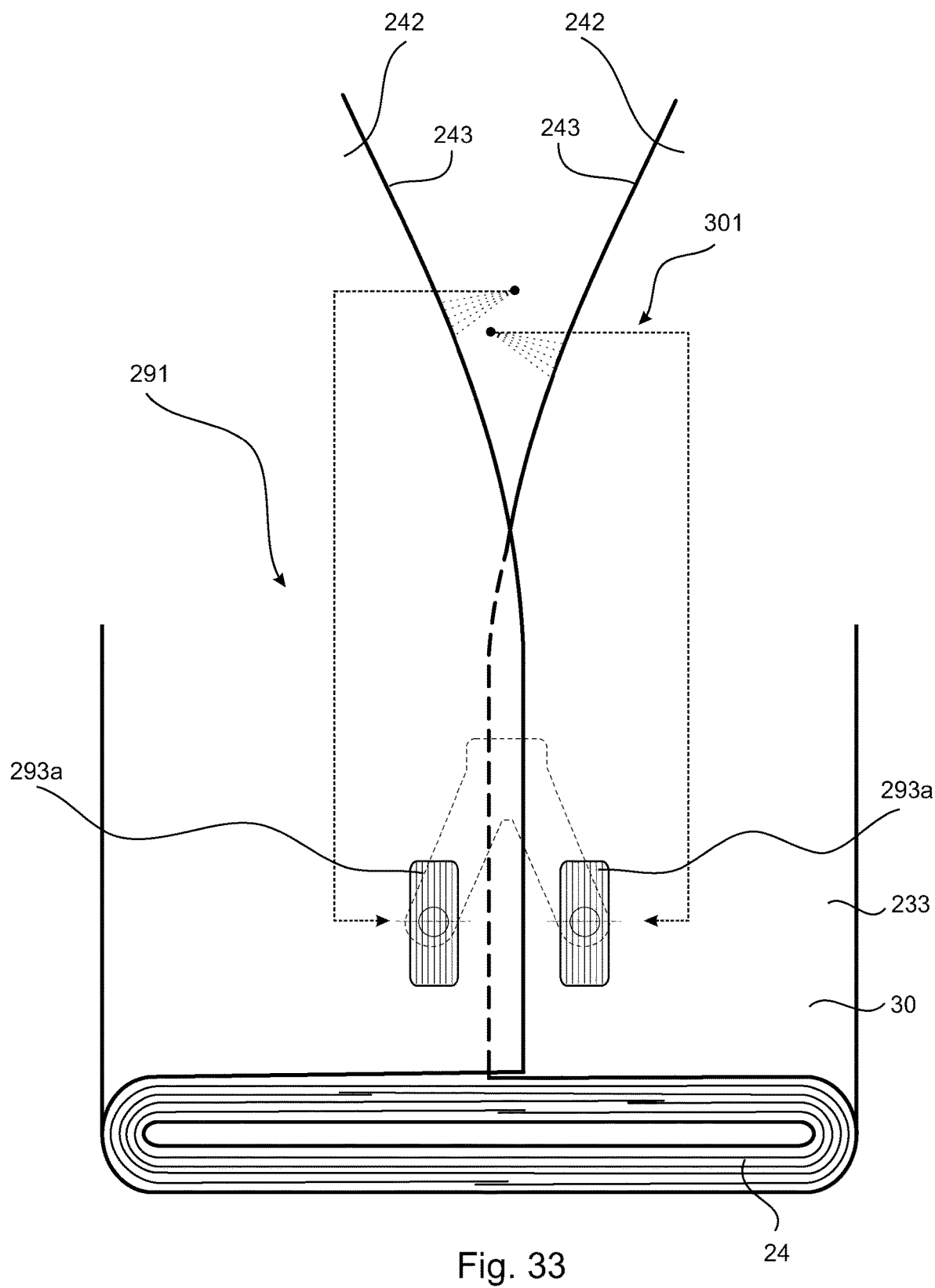
FIG. 33 a schematic view illustrating a variation of the guidance system.

A variation of the guidance system 291 is depicted schematically in FIG. 33. In the illustrated arrangement there are steerable elements 185a positioned for interaction with the strip 50 while the longitudinal marginal side portion 53 are in an overlapping condition but prior to bonding. The steerable elements 185a may be additional to, or a replacement for, the steerable elements described previously in relation to FIGS. 21 to 24. The steerable elements 185a operate under the control of control system 107 in the same way as steerable elements 185.

While in the arrangements shown there is only one steerable element (185 or 185a) associated with each longitudinal marginal side portion 53, there may of course be a plurality of steerable elements associated with each longitudinal marginal side portion. In such a case the steerable elements associated with each longitudinal marginal side portion 53 may operate in tandem.

The overlapping station 104 and the bonding station 105, are integrated with the assembly station 106 station 105. The operations performed at the overlapping station 104 and the bonding station 105 are as previously described to complete assembly of the inner layer 41a about the inner tube 30.

Once the innermost layer 41a has been wrapped about the tube 30 as previously described, the second layer 41b can then be wrapped about the innermost layer 41a This is followed by wrapping of a third layer 41c about the second layer 41b. The process is repeated until all required layers 41 are in position. Additionally, if infusion media is to be provided, the infusion media layer 43 is wrapped about previously installed concentric layers 41.

As stated above, the production of the prefabricated tubular assembly 24 may involve various passes of the tubular assembly 24 under construction through the apparatus 100, with each pass installing the next layer. Alternatively, the apparatus 100 may have a plurality of stations in series, with each station installing a respective one of the various layers, preferably at different orientations around the circumference of the tubular assembly.

From the foregoing, it is notable that the inner tube 30 and the innermost layer 41a of reinforcing fabric immediately surrounding the inner tube, can be considered as a tubular assembly comprising an inner portion and a further portion surrounding the inner portion, with the inner tube 30 constituting the inner portion and the innermost layer 41a of reinforcing fabric constituting the further portion surrounding the inner portion. For the purposes of further description, the tubular assembly comprising the inner tube 30 and the innermost layer 41a will hereinafter be referred to as the first tubular assembly.

The next innermost layer 41b could be considered to be surrounding the first tubular assembly. Accordingly, said next innermost layer 41b and said first tubular assembly, can be considered as a tubular assembly comprising an inner portion and a further portion surrounding the inner portion, with said first tubular assembly constituting the inner portion and the next innermost layer 41b constituting the further portion surrounding the inner portion.

Accordingly, any one layer 41 (together with any preceding layers 41 and the inner tube 30) may constitute said inner portion, and another layer surrounding said one layer may constitute said further portion.

Referring now to FIGS. 26, 27 and 28, there is shown a mobile facility 200 for construction and laying of pipeline 10. The mobile facility 200 comprises a vehicle 201 adapted to travel along a site at which the pipeline 10 is being produced and laid. In the arrangement shown schematically in FIG. 26, the vehicle 201 comprises a prime mover 203 and a load carrying portion 205 configured to receive apparatus, equipment and supplies used in the pipe production process.

Included on the load carrying portion 205 is compression apparatus 207 for compression of the assembled tubular structure 40 to close the inner tube 30, as described earlier. The compression apparatus 207 may comprise apparatus disclosed in the Applicant's international application PCT/AU2015/000332, the contents of which are incorporated herein by way of reference.

In the arrangement shown, there is provided a container 211 accommodating a supply of prefabricated tubular assemblies 24. The supply comprises a plurality of lengths of the prefabricated tubular assembly 24, each folded into a compact condition from which it can be deployed as required. The lengths of the prefabricated tubular assembly 24 can each be progressively withdrawn from the container 211 as required during the pipe construction process. When the supply of prefabricated tubular assemblies 24 requires replenishment, the existing container 211 can be removed from the load carrying portion 205 of the vehicle 201 and substituted with a replacement container accommodating a new supply of prefabricated tubular assemblies 24.

Further, there is provided a supply of material which provides the flexible outer casing 23. In the arrangement shown, the supply is in roll form and comprises a web or ribbon of strip material wound upon a reel 215.

Still further, there is provided a supply of resinous binder used in the process to integrate the two portions 21, 22, the supply of resinous binder being accommodated in reservoir 217.

Still further, there is provided an assembly station 220 at which the flexible outer casing 23 is installed around the prefabricated tubular assembly 24, and resinous binder is introduced into the reinforcement 37 of the prefabricated tubular assembly 24, with the resinous binder being contained by the installed outer casing 23.

Still further, there is provided the previously described compression apparatus 207. The compression apparatus 207 is positioned at or adjacent the end of the load carrying portion 205 of the mobile facility 200.

FIG. 27 depicts, schematically, inflation of the assembled tubular structure 40 through delivery of inflation fluid such as air by way of blower or compressor 223 at the distal end of the tubular structure. The inner tube 30 of the assembled tubular structure 40 is closed by the compression apparatus 207 on the mobile facility 200. The compression apparatus 207 is positioned at or adjacent the end of the load carrying portion 205 of the mobile facility such that the assembled tubular structure 40 can "snake" downwardly from the mobile facility and onto the ground over which the mobile facility is travelling as the pipe 20 is progressively produced. The compression apparatus 207 advances with the mobile facility 200. In FIG. 27, the assembled tubular structure 40 is shown in an inflated condition behind the advancing compression apparatus 207 and in an un-inflated condition ahead of the advancing compression apparatus 207.

FIG. 28 depicts, schematically, inflation of the assembled tubular structure 40 and movement of resinous binder through reinforcement 37 within the tubular structure. As the assembled tubular structure 40 is progressively inflated and the space in which the reinforcement 37 is confined progressively decreases, the resinous binder is forced through the layers 41 of reinforcing fabric for distribution within the space in a controlled and constrained manner. The resinous binder is caused to move through the layers 41 of reinforcing fabric within the space as a progressively rising resin pool or wave as a consequence of the progressively decreasing volume of the space. The progressively rising resin pool is shown schematically in FIG. 28, with the notional surface of the progressively rising resin pool being identified by reference numeral 224. Vents 225 are provided in the outer casing 23 to facilitate expulsion of the air from space are also shown. The vents 225 may comprise perforations formed by a perforating mechanism provided as part of the mobile facility 200.

At the assembly station 220, the flexible outer casing 23 is installed around the prefabricated tubular assembly 24, and resinous binder is introduced into the reinforcement 37 of the prefabricated tubular assembly 24, with the resinous binder being contained by the installed outer casing 23.

Figure 29:
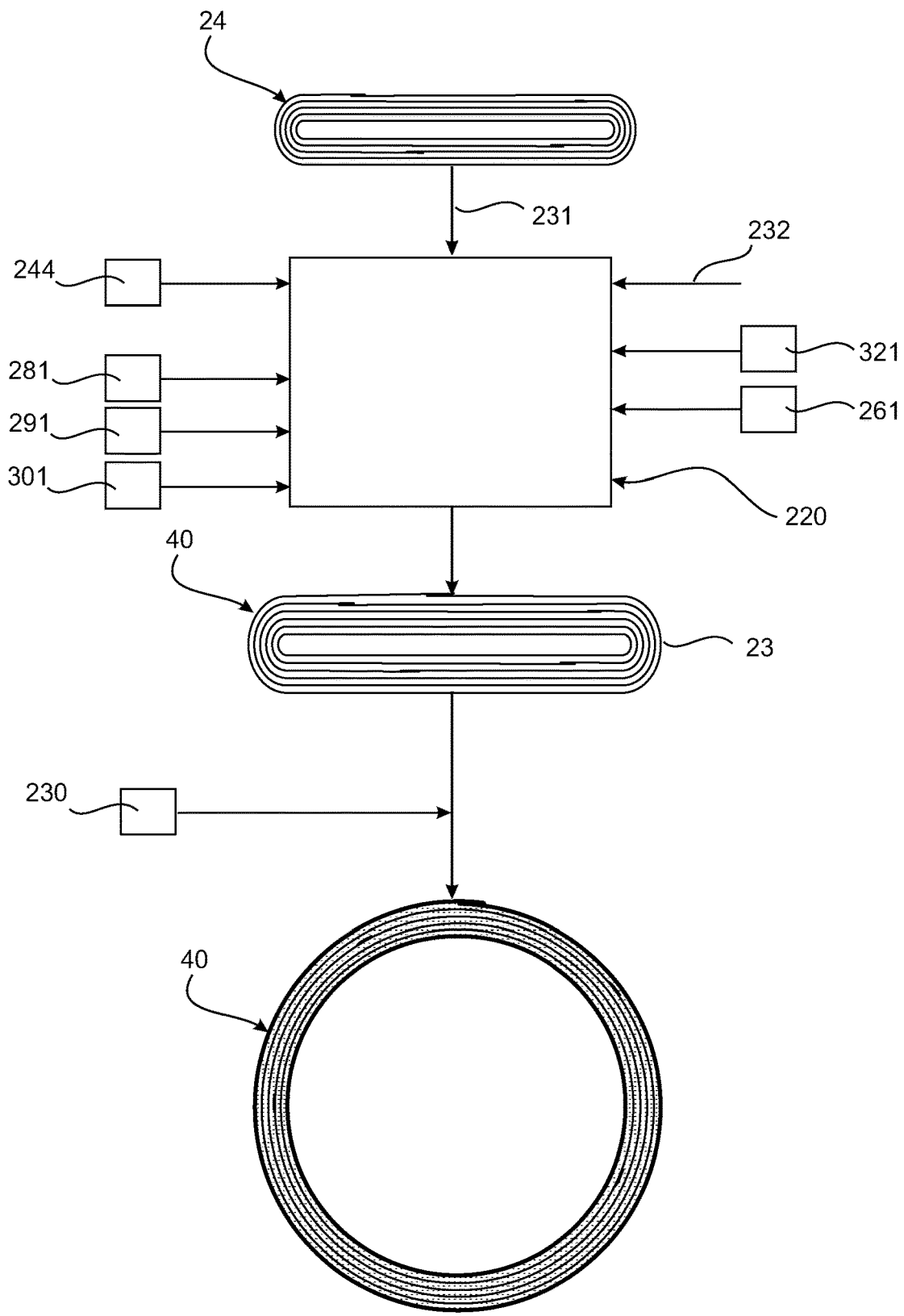
FIG. 29 is a schematic view depicting various operations performed to install a flexible outer casing around the prefabricated tubular assembly to provide the assembled tubular structure.
Figure 30:
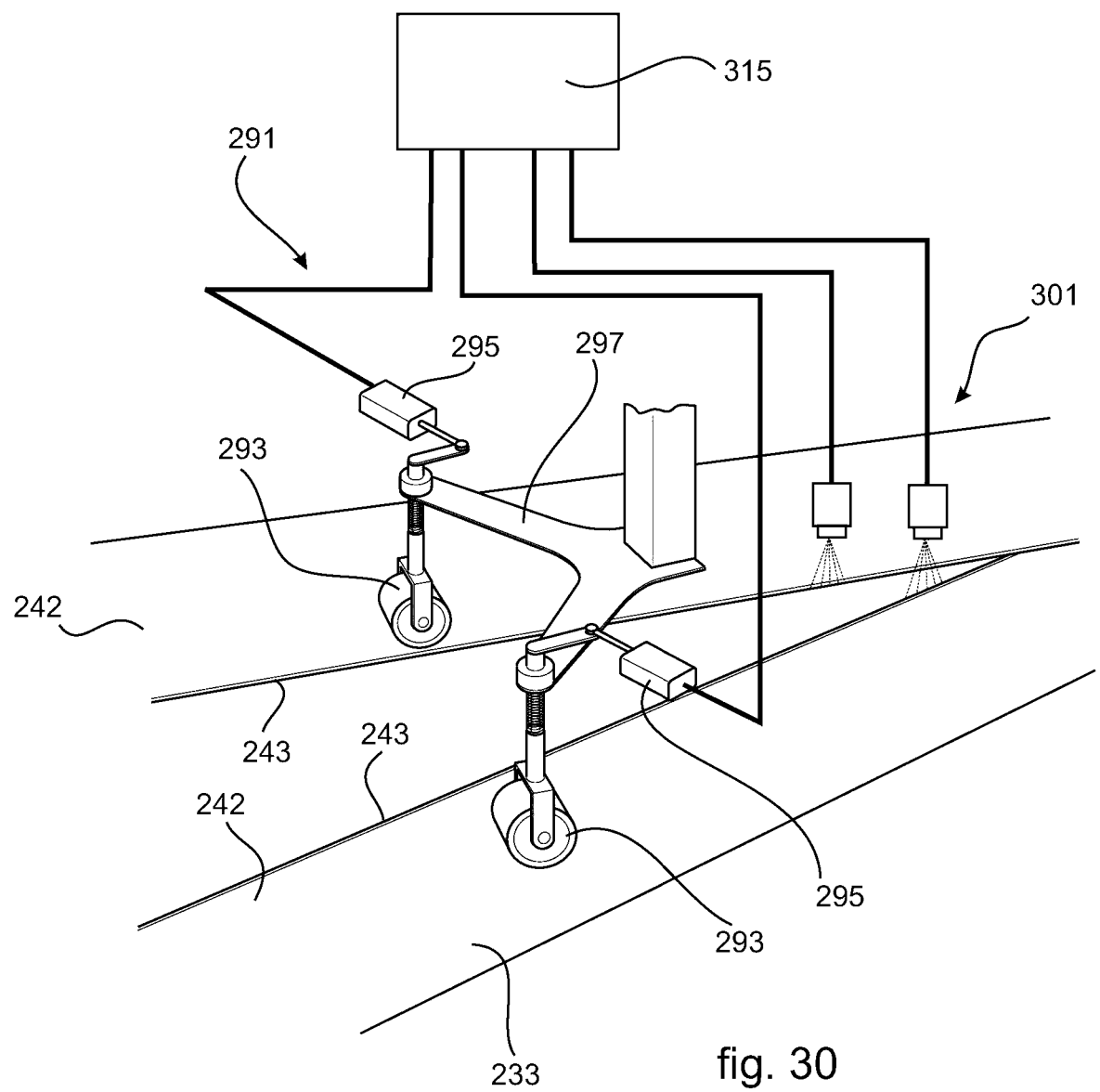
FIG. 30 a schematic perspective view of part of the assembly apparatus, illustrating in particular a guidance system for guiding the strip to maintain the two longitudinal marginal side portions in correct alignment with the guide.

FIG. 29 is a schematic view depicting various operations performed to install the flexible outer casing 23 around the prefabricated tubular assembly 24 to provide the assembled tubular structure 40, with resinous binder being introduced into the reinforcement 37 of the prefabricated tubular assembly 24, and the assembled tubular structure 40 subsequently being inflated. The step involving inflation of the assembled tubular structure 40 is identified in FIG. 29 by reference numeral 230. Inflation of the assembled tubular structure 40 brings the inner tube 30 into direct contact with the reinforcement 37, and also brings the reinforcement 37 into direct contact with the outer casing 23.

The prefabricated tubular assembly 24 advances from the container 211 to the assembly station 220 along a first path 231.

The outer casing 23 is formed from a strip 233 in the form of the web 235 unwinding from reel 237. The strip 233 advances from the reel 237 to the assembly station 220 along a second path 232.

The strip 233 comprises a central longitudinal portion 241 and two longitudinal marginal side portions 242 on opposed sides of the central longitudinal portion. Each longitudinal marginal side portion 242 has a longitudinal edge 243. The strip 237 is typically of unitary construction, with the central longitudinal portion 241 and two longitudinal marginal side portions 242 being zones of the unitary strip identified for reference purposes, rather than being distinct or separate parts. However, the strip 233 need not necessarily be of unitary constriction, and the central longitudinal portion 241 and two longitudinal marginal side portions 242 may alternatively comprise distinct or separate parts joined together.

The strip 233 is wrapped around the prefabricated tubular assembly 24 at the assembly station 220, with the two marginal side portions 242 disposed in overlapping relation and affixed together to assemble the strip into a tubular configuration providing the outer casing 23 about the prefabricated tubular assembly 24, as will be explained in more detail later. This comprises a garniture wrapping step identified in Figure X by reference numeral 244

The two marginal side portions 242 of the strip 233 are affixed together to provide a longitudinal lap seam 245. The two marginal side portions 242 of the strip 233 are affixed together in a manner to provide a robust or permanent seam which does not release or lose integrity upon radial expansion of the casing 23. In other words, and in contrast to the longitudinal lap seams 55 of the layers 41 within the prefabricated tubular assembly 24, longitudinal lap seam 245 is not constructed to facilitate slippage between the two marginal side portions in the seam. Rather, it unyieldingly locks the two marginal side portions 253 together at the seam 245 the seam In advancing from the reel 237 to the assembly station 220 along the second path 232, the web 235 providing the strip 233 is progressively folded upon itself from a flat condition into a tubular configuration with the two longitudinal marginal side portions 109 in overlapping relation. This is somewhat similar to the manner in which strips 50 were folded to provide the layers 41, 42 in the layers of the prefabricated tubular assembly 24. Similarly, various guide elements are provided along the path 232 of movement of the strip 233 for progressively causing the strip to assume the tubular configuration with the two longitudinal marginal side portions 242 in overlapping relation. The guide elements include turn elements about which the web 235 is turned for directional control, and profiling elements for causing the web to fold longitudinally to progressing urge the central longitudinal portion 241 to assume an arcuate profile and move the two longitudinal marginal side portions 242 inwardly towards each other.

The assembly station 222 comprises a plate structure 251 defining a wall 253. In the arrangement shown, the first path 231 passes below the wall 253 and the second path 232 surrounds the wall.

The assembly station 220 further comprises a base portion 255 mounted below the plate structure 251. In the arrangement shown, the base portion 255 is suspended from the plate structure 251 at the edges providing connections 257.

The base portion 255 and the plate structure 251 cooperate to define a space 259 through which the first path 231 extends. With this arrangement, the prefabricated tubular assembly 24 passes through the space 259, as shown in FIG. 29.

Figure 31:
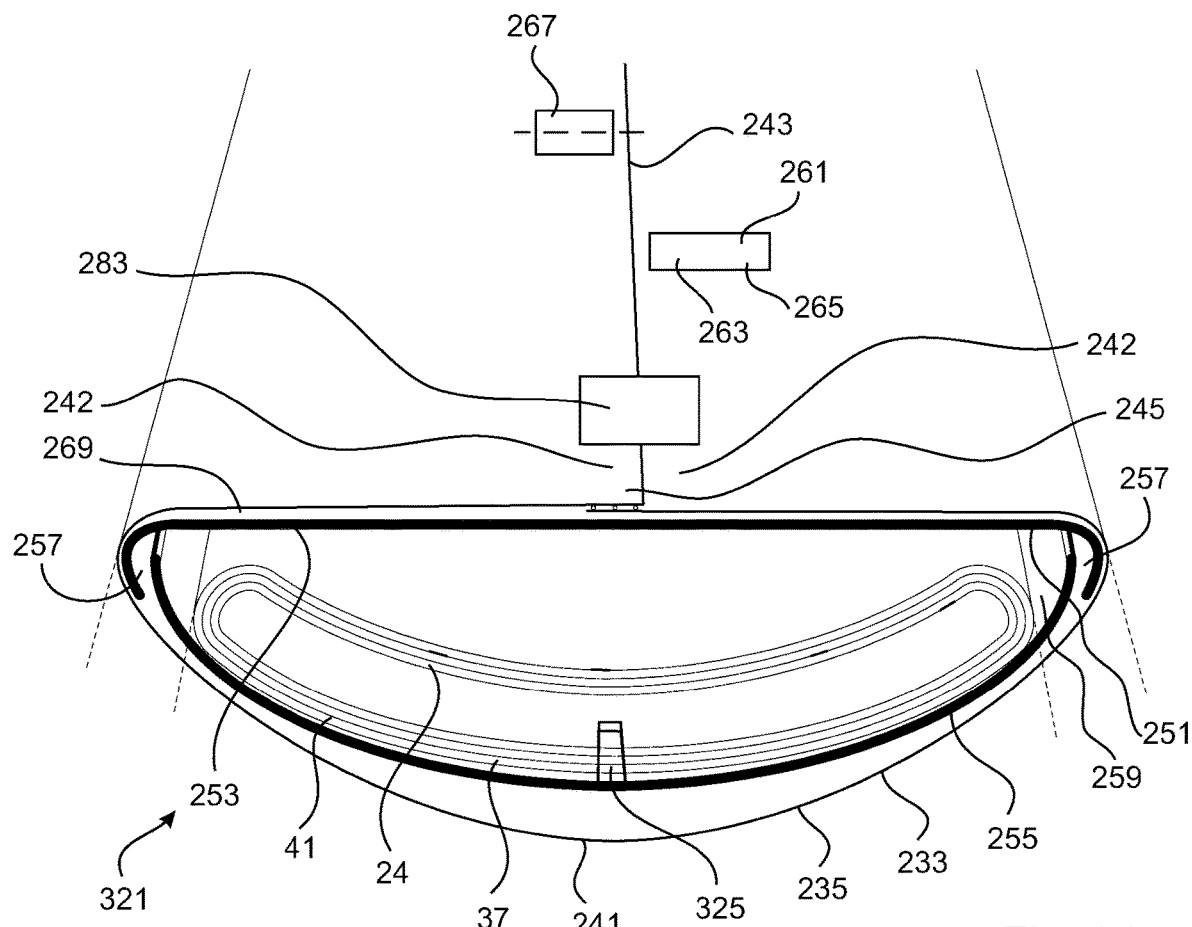
FIG. 31 a further schematic perspective view of part of the assembly apparatus.

As the prefabricated tubular assembly 24 passes through the space 259, the strip 233 is wrapped around the prefabricated tubular assembly 24 to form the outer casing 23. More particularly, the strip 233 progressively assumes the tubular configuration as it approaches the assembly station 220. Upon arrival of the strip 233 at the assembly station 220, the tubular configuration encircles the base portion 255 and the plate structure 251, and thus also the prefabricated tubular assembly 24 passing through the space 259, as best seen in FIG. 31. With this arrangement, the outer casing 23 is installed completely about the prefabricated tubular assembly 24 upon the prefabricated tubular assembly 24 exiting from the space 259, thereby completing the assembled tubular structure 40.

The assembly station 220 further comprises a system 261 for affixing the two longitudinal marginal side portions 242 together in overlapping relation to complete assembly of the strip 233 into a tubular configuration to provide the outer casing 23 about the prefabricated tubular assembly 24.

The affixing system 261 for affixing the two longitudinal marginal side portions 242 together in overlapping relation may take any appropriate form. In the arrangement shown, the affixing system 261 comprises a heat welding apparatus 263, comprising a probe 265 for delivering hot air into a gap between the overlapping longitudinal marginal side portions 242. Subsequent closing of the gap by pressing the two longitudinal marginal side portions 242 together establishes bonding therebetween by way of a plastic weld.

The affixing system 261 further comprises a press 267 for pressing the two portions 242 into contact one with the other to establish bonding therebetween by way of the plastic weld, as described above. This may be followed by a cooling blast of air to cool or chill the weld to facilitate maximum strength of the welded joint quickly before it comes under inflation loads as it exits the affixing system 261. The wall 253 at the assembly station 220 presents a wall surface 269, and the press 267 is provided for pressing the two longitudinal marginal side portions 242 together against the wall surface. 269. The wall 269 may be heated. In the arrangement shown, the press 267 comprises a press roller system, with the overlapping marginal side portions 242 passing between the press roller system and the wall surface 269.

The affixing system 261 may be mounted on a lateral rail system, permitting selective positional adjustment, or any rapid introduction or removal of a heat source, as may be required.

The assembly station 220 further comprises an alignment system 281 for aligning the two longitudinal marginal side portions 242 in overlapping relation prior to being affixed together.

The alignment system 281 comprises a guide 283 mounted on the plate structure 251. The alignment system 281 is somewhat similar in construction and operation to the alignment system 151 described previously in relation to construction of the prefabricated tubular assembly 24, and as such will not be described in any further detail.

The assembly station 220 further comprises a guidance system 291 for guiding the strip 233 for maintaining the two longitudinal marginal side portions 242 in correct alignment with the guide 283; that is, to maintain the two longitudinal marginal side portions 242 correctly positioned within the guide paths defined by the opposed slots within the guide 283.

The guidance system 291 is somewhat similar in construction and operation to the guidance system 181 described previously, and as such will not be described in any further detail. It should however be noted that the guidance system 291 includes steerable elements 293 operable in a manner similar to that discussed in relation to steerable elements 183.

Steering is provided by way of steering motors 295 mounted on the chassis 297 and operatively coupled to the steerable elements 293.

The guidance system 291 further comprises a monitoring system 301 for monitoring travel of the strip 233 through the assembly station 220. More particularly, the monitoring system 301 is operable to track travel of the two longitudinal marginal side portions 242 in assuming the overlapping condition that is required for affixing them together. In this embodiment, the monitoring system 301 is operable to track travel of the two longitudinal marginal side portions 242 relative to the alignment system 281. In the event of an out-of-alignment condition being detected, the monitoring system 301 is operable to initiate remedial action; for example, through initiating operation of the steering facility for the steerable elements 293. Operation of the steering facility is initiated though operation of either one or both of the steering motors 295, as necessary.

The monitoring system 301 is somewhat similar in construction and operation to the monitoring 181 described previously, and as such will not be described in any further detail. It should however be noted that the monitoring system 301 includes optical tracking operable in a manner similar to that discussed previously.

The monitoring system 301 features optical tracking, as discussed previously, although of course other tracking systems may be deployed.

As was the case previously, the optical tracking system 311 is operable to track a feature of the strip 233 indicative of the alignment of the respective longitudinal marginal side portion 242. In this case the feature of the strip 233 being tracked is the periphery of the strip; specifically, each longitudinal edge 243 of the strip. Tracking the longitudinal edges 243 of the strip 233 is feasible in this instance because the strip has straight edges owing to the material from which it is made and the manner in which it is made or accurately cut to size. This is in contrast to the longitudinal edge of the strips 50 which provide the layers 41 of the prefabricated tubular assembly 24 which are of woven fibre construction and as such do not feature clean or clear edges which are appropriate as a basis for reliable tracking.

As mentioned above, the monitoring system 301 includes optical tracking operable, although other tracking systems may be deployed. For instance, tracking may be by way of a positional sensing system interacting with each longitudinal edge 243 of the strip 233. The positional sensing system may have tactile sensors such as micro-switches interacting with the longitudinal edges 243 of the strip 233.

Operations at the guidance system 291 further comprises a monitoring system 301 may be under the control of a control system 315 such as a computer control system. The control system 315 may also control other operations conducted at the assembly station 220.

Figure 32:
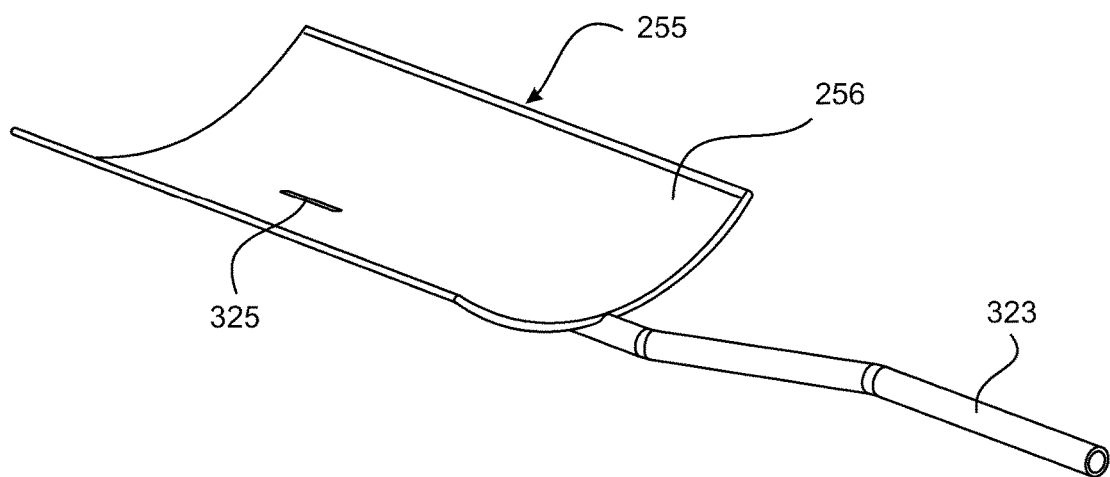
FIG. 32 a further schematic perspective view of part of the assembly apparatus.

The assembly station 220 further comprises a system 321 for delivery of resinous binder to the reinforcement 37 of the prefabricated tubular assembly 24 as the latter passes through the space 259, as shown in FIGS. 31 and 32. The resinous binder is delivered along a supply line 323 extending from the reservoir 21 7 to a delivery port 325 opening onto the space 259 through the base portion 255 which defines a surface 256 over which the prefabricated tubular assembly 24 moves. In the arrangement shown, the delivery port 325 is of elongate configuration. There may be more than one delivery port 325 in other embodiments, if desired.

The surface 256 is configured to direct the injected resin binder upwardly and outwardly through the annular section defined between the inner tube 30 and outer casing 23 in which the reinforcement 37 is confined. In the arrangement shown, the surface is concave.

The surface 256 may be configured in any other appropriate way for delivery of resinous binder into the reinforcement 39; for example the surface 256 may comprise channels through which the resin binder is delivered With this arrangement, resin binder is injected into the bottom of the space 259 for exposure to the infusion media layer 43 and the associated reinforcing fabric tubular layers 41 of the prefabricated tubular assembly 24 as the latter passes through the space 259.

The outer casing 23 is installed completely about the prefabricated tubular assembly 24 upon the prefabricated tubular assembly 24 exiting from the space 259, and so the resinous binder so introduced is contained within the assembled tubular structure 40 by the outer casing 23.

The resinous binder is subsequently caused to move through the concentric reinforcing fabric tubular layers 41 and the infusion layer 43 within the assembled tubular structure 40 as a progressively rising resin pool or wave (as a consequence of the progressively decreasing volume of the space between the expanding inner tube 30 and the flexible outer casing 23), as previously described.

A variation of the guidance system 291 is depicted schematically in FIG. 33. In the illustrated arrangement, there are steerable elements 293a positioned for interaction with the strip 233 while the longitudinal marginal side portions 242 are in an overlapping condition but prior to bonding. The steerable elements 293a may be additional to, or a replacement for, the steerable elements described previously. The steerable elements 293a operate under the control of control system 315 in the same way as steerable elements 293.

From the foregoing, it is evident that the assembled tubular structure 40 can be considered as a tubular assembly comprising an inner portion and a further portion surrounding the inner portion, with the prefabricated tubular assembly 24 constituting the inner portion and the flexible outer casing 23 constituting the further portion surrounding the inner portion.

It should be appreciated that the scope of the invention is not limited to the scope of the embodiment described. Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Modifications and variations such as would be apparent to the skilled addressee are considered to fall within the scope of the present invention.

The present disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While a preferred embodiment of the invention has been described and illustrated, it is clear that the invention is not so limited. Numerous modifications, changes, variations, substitutions, and equivalents will occur to those skilled in the art having the benefit of this disclosure without departing from the spirit and scope of the present invention as defined by the following claims.

Reference to positional descriptions, such as "inner", "outer", "upper", "lower", "top" and "bottom", are to be taken in context of the embodiments depicted in the drawings, and are not to be taken as limiting the invention to the literal interpretation of the term but rather as would be understood by the skilled addressee.

Additionally, where the terms "system", "device", and "apparatus" are used in the context of the invention, they are to be understood as including reference to any group of functionally related or interacting, interrelated, interdependent or associated Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An apparatus for constructing a tubular assembly comprising an inner portion and a further portion surrounding the inner portion, the inner portion comprising a reinforcement and the further portion being formed from a strip of material comprising two opposed longitudinal marginal side portions; the apparatus comprising: an assembly station comprising a wall; means for advancing the strip along a path and causing the strip to encircle the wall and thereby wrap about and surround the inner portion, to form a prefabricated tubular assembly; a surface over which the prefabricated tubular assembly is caused to move; means for introducing a resinous binder into the reinforcement as the strip is being wrapped about the inner portion; wherein the surface has a least one port through which the resinous binder is delivered to the reinforcement; wherein the wall is defined by a plate structure and the surface is defined by a base portion mounted below the plate structure; wherein the base portion and the plate structure define a space; and wherein the base portion is suspended from the plate structure.

* * * * *